Oct. 18, 1960 H. H. WHEELER 2,956,567
CIGAR MACHINE
Original Filed Nov. 26, 1946 18 Sheets-Sheet 1

INVENTOR
HENRY H. WHEELER
BY *Bradley Cohn*
ATTORNEY

Oct. 18, 1960  H. H. WHEELER  2,956,567
CIGAR MACHINE
Original Filed Nov. 26, 1946  18 Sheets-Sheet 4

INVENTOR
HENRY H. WHEELER
BY
*Bradley Cohn*
ATTORNEY

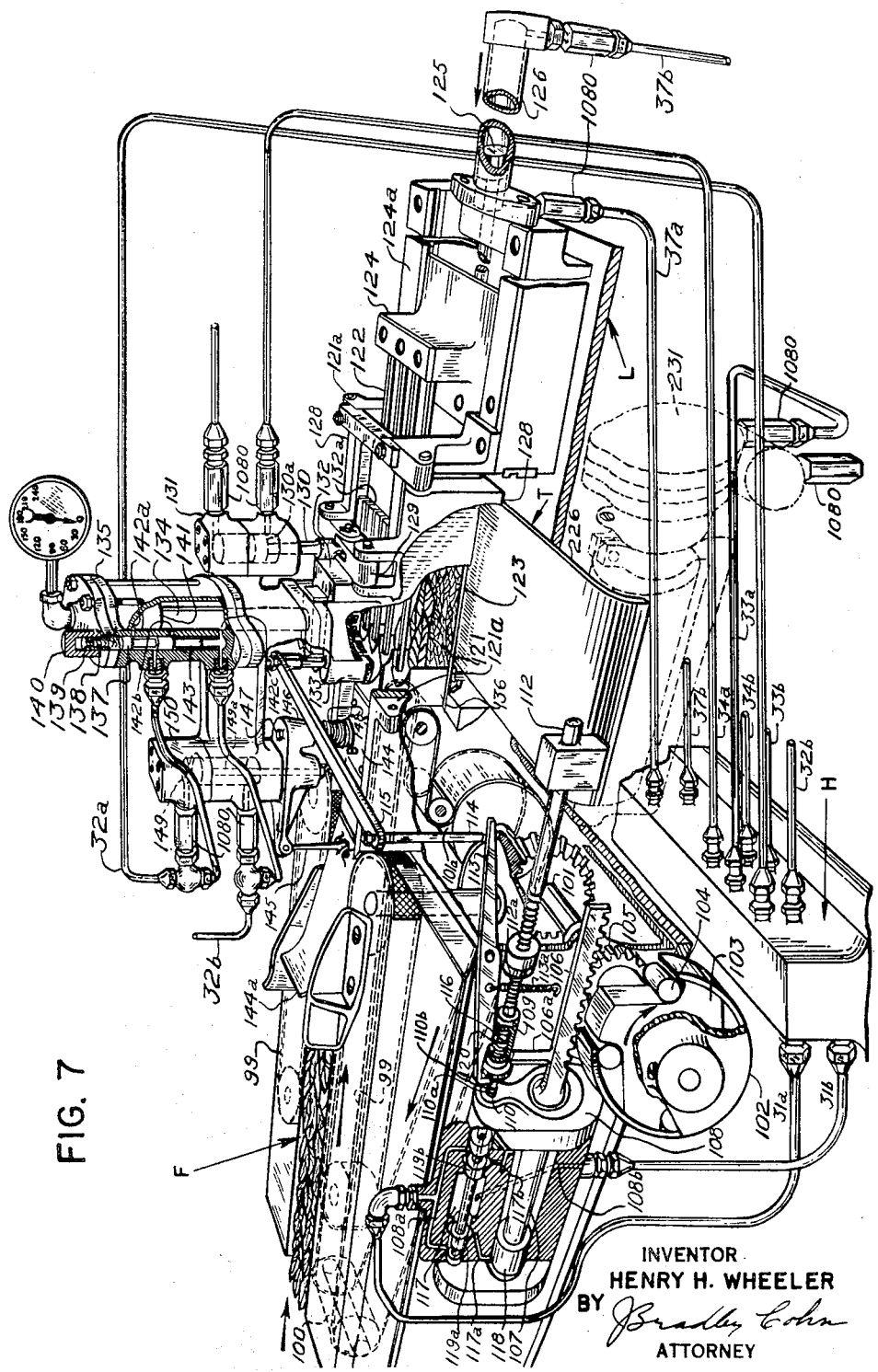

Oct. 18, 1960

H. H. WHEELER 2,956,567

CIGAR MACHINE

Original Filed Nov. 26, 1946

INVENTOR
HENRY H. WHEELER
BY
ATTORNEY

Oct. 18, 1960 H. H. WHEELER 2,956,567
CIGAR MACHINE
Original Filed Nov. 26, 1946 18 Sheets-Sheet 7
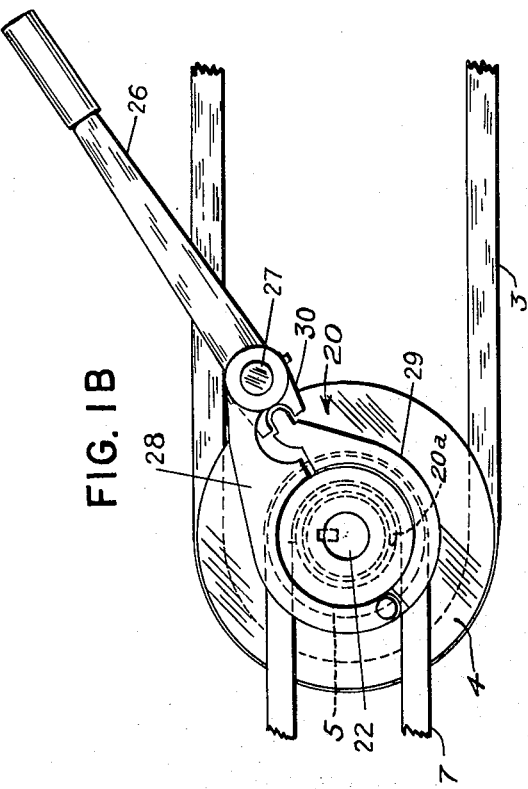
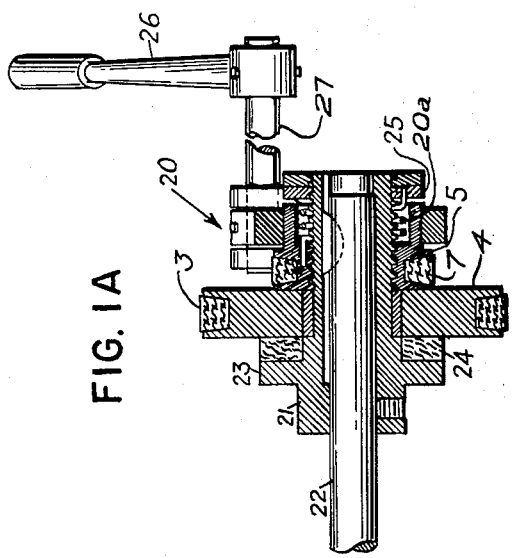
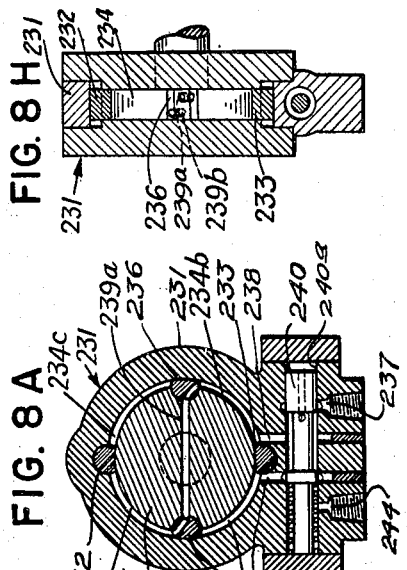
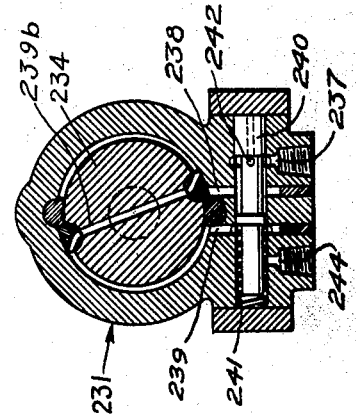
INVENTOR
HENRY H. WHEELER
BY
ATTORNEY Oct. 18, 1960 H. H. WHEELER 2,956,567
CIGAR MACHINE
Original Filed Nov. 26, 1946 18 Sheets-Sheet 8
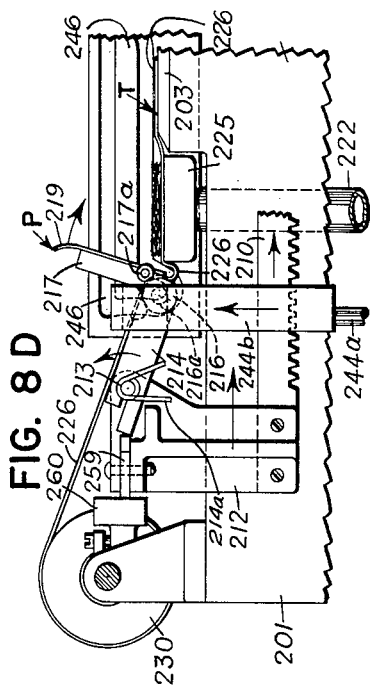
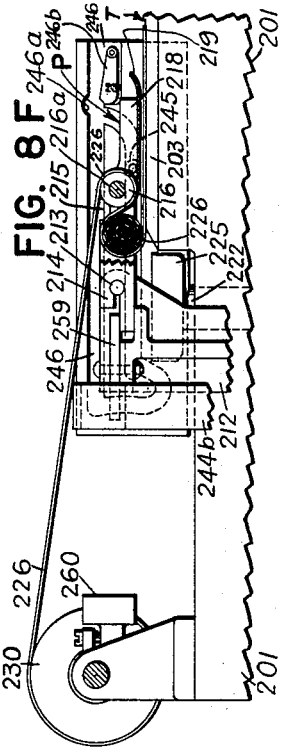
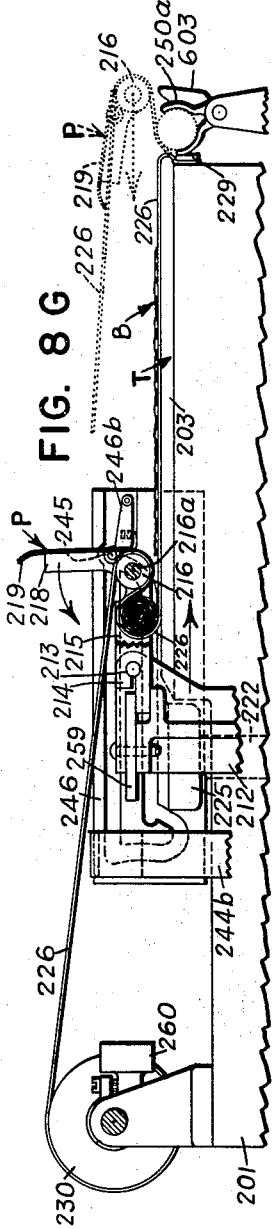
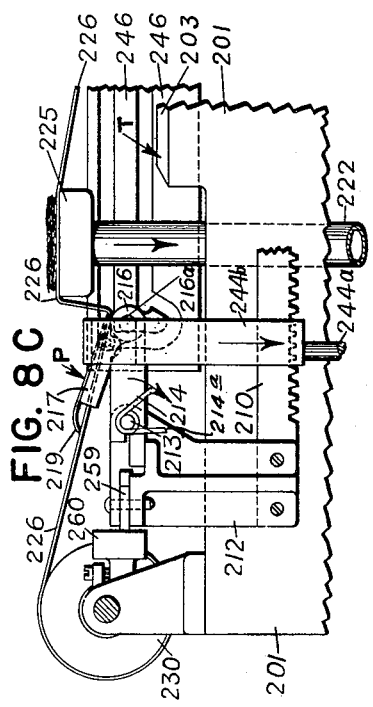
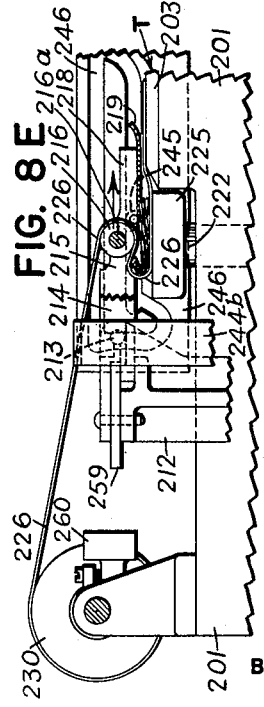
INVENTOR
HENRY H. WHEELER
BY
ATTORNEY

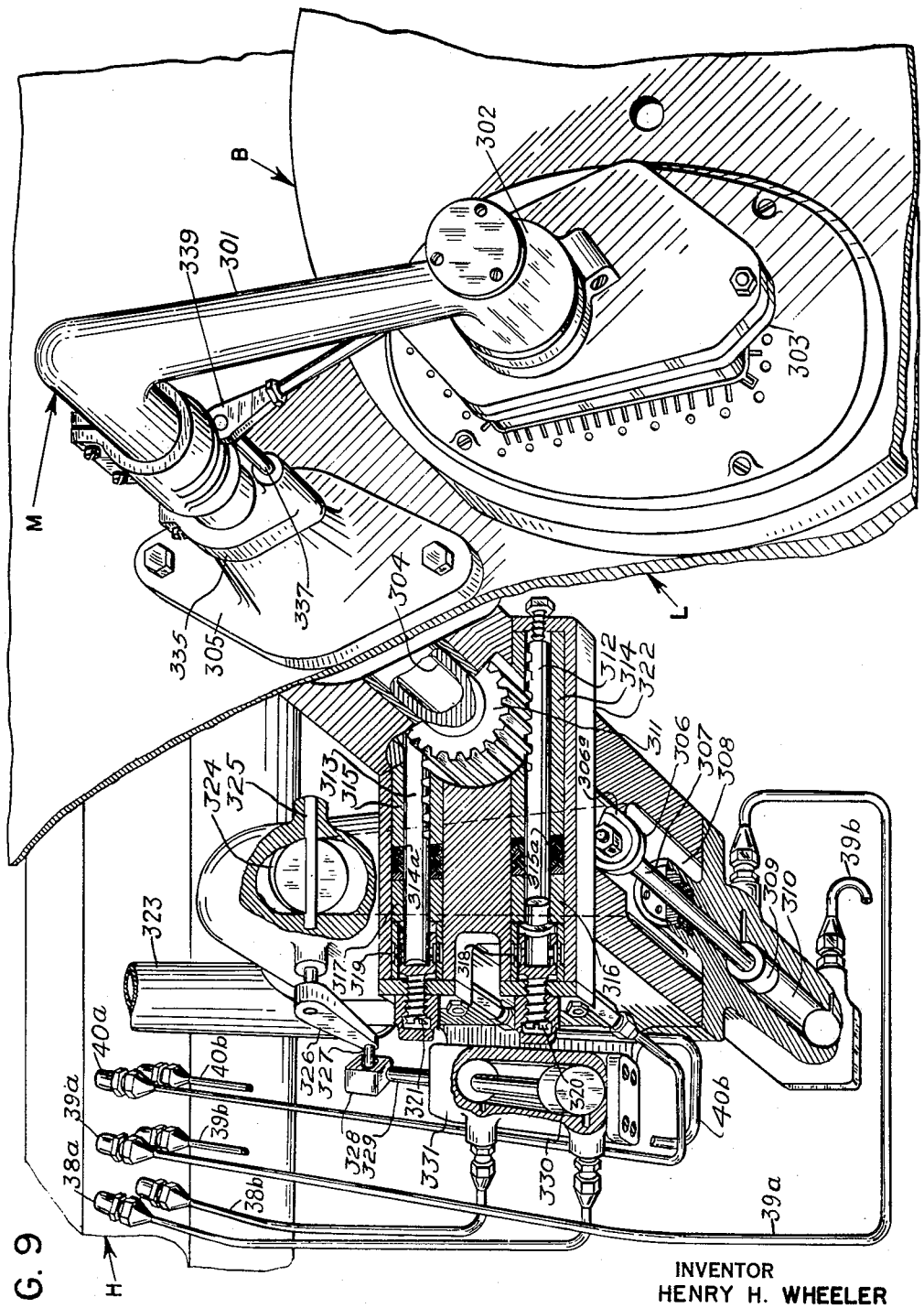

Oct. 18, 1960 — H. H. WHEELER — 2,956,567
CIGAR MACHINE
Original Filed Nov. 26, 1946 — 18 Sheets-Sheet 11

INVENTOR
HENRY H. WHEELER
BY Joseph Shea
ATTORNEY

Oct. 18, 1960     H. H. WHEELER     2,956,567
CIGAR MACHINE

Original Filed Nov. 26, 1946     18 Sheets-Sheet 12

INVENTOR
HENRY H. WHEELER
BY Joseph Shea
ATTORNEY

Oct. 18, 1960 H. H. WHEELER 2,956,567
CIGAR MACHINE
Original Filed Nov. 26, 1946 18 Sheets-Sheet 13
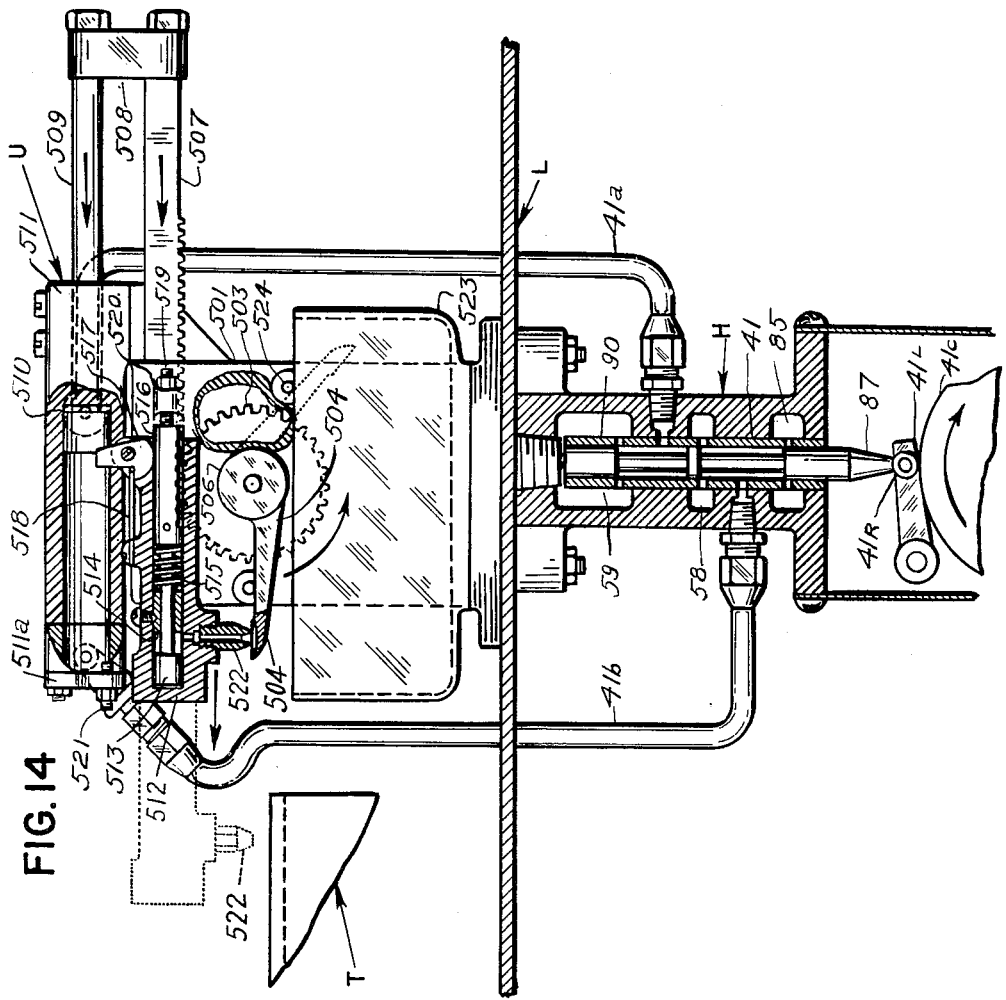
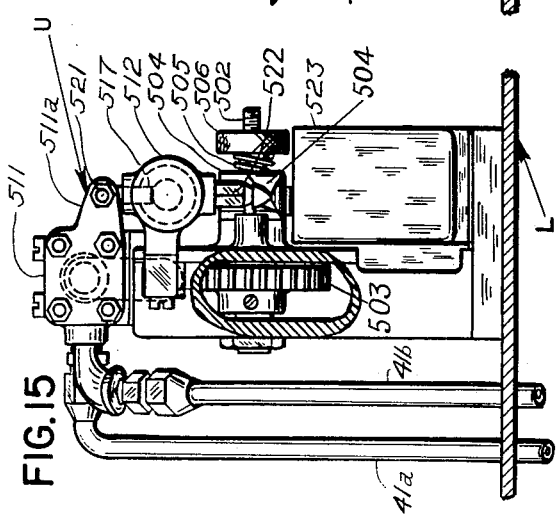
INVENTOR
HENRY H. WHEELER
BY Joseph Shea
ATTORNEY Oct. 18, 1960
H. H. WHEELER
2,956,567
CIGAR MACHINE
Original Filed Nov. 26, 1946
18 Sheets-Sheet 14
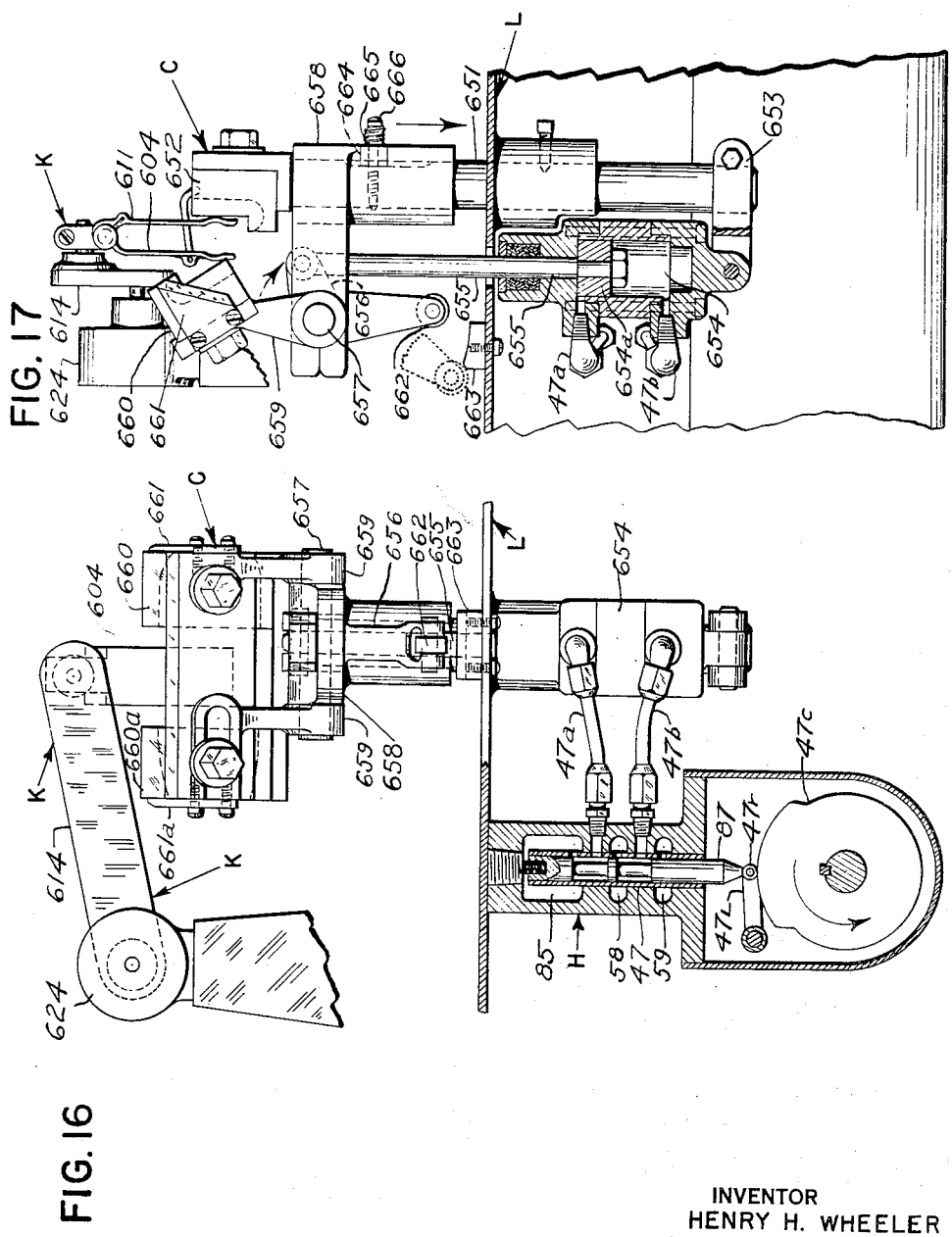
INVENTOR
HENRY H. WHEELER
BY Joseph Shea
ATTORNEY

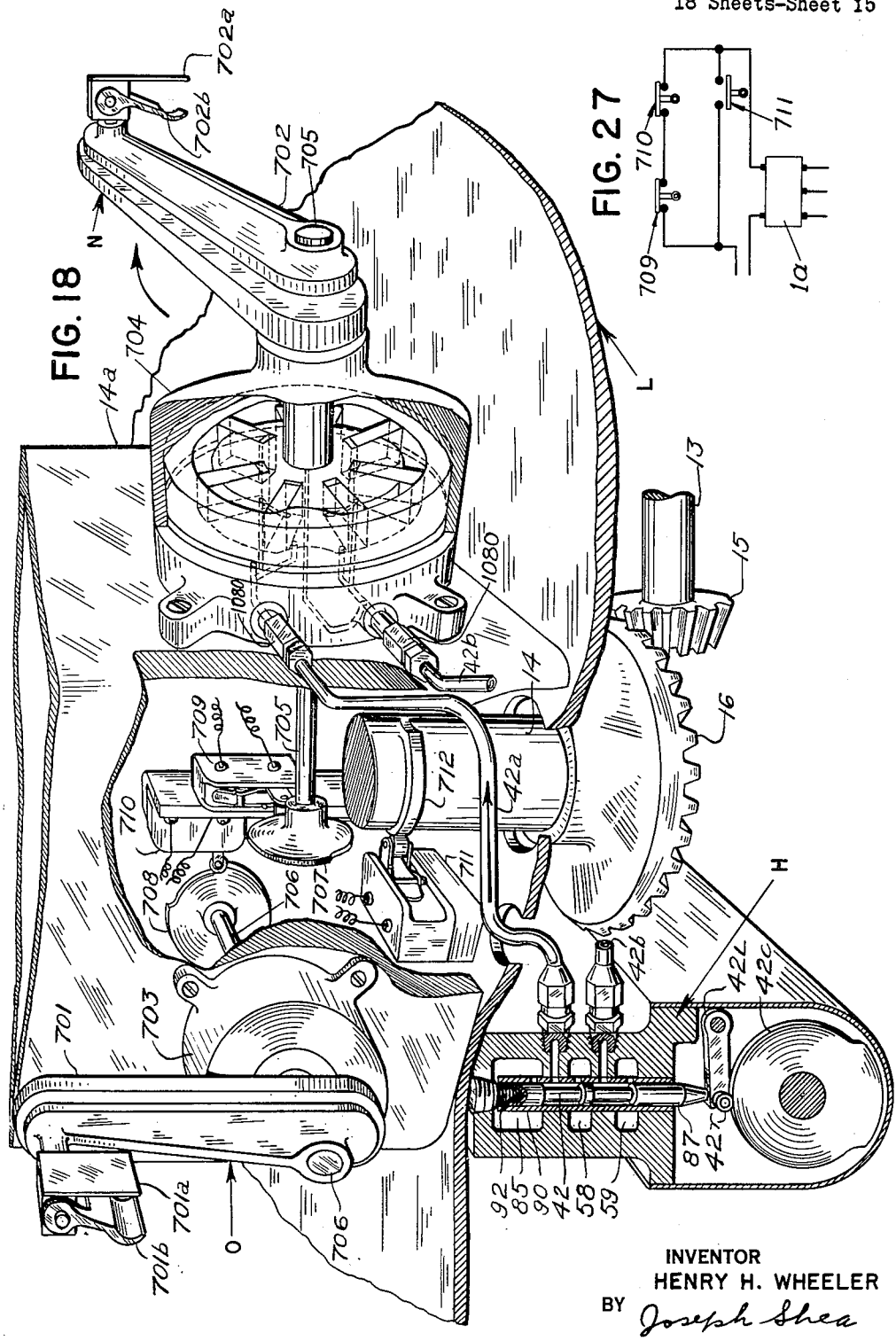

INVENTOR
HENRY H. WHEELER
BY Joseph Shea
ATTORNEY

Oct. 18, 1960     H. H. WHEELER     2,956,567
CIGAR MACHINE
Original Filed Nov. 26, 1946     18 Sheets-Sheet 17
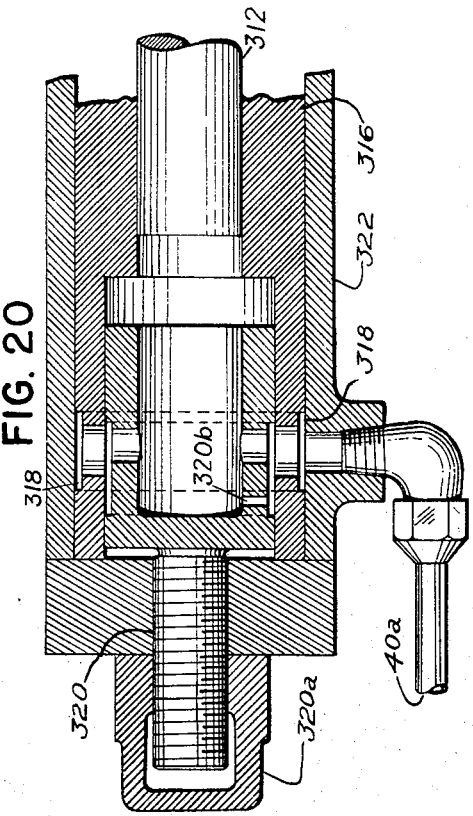
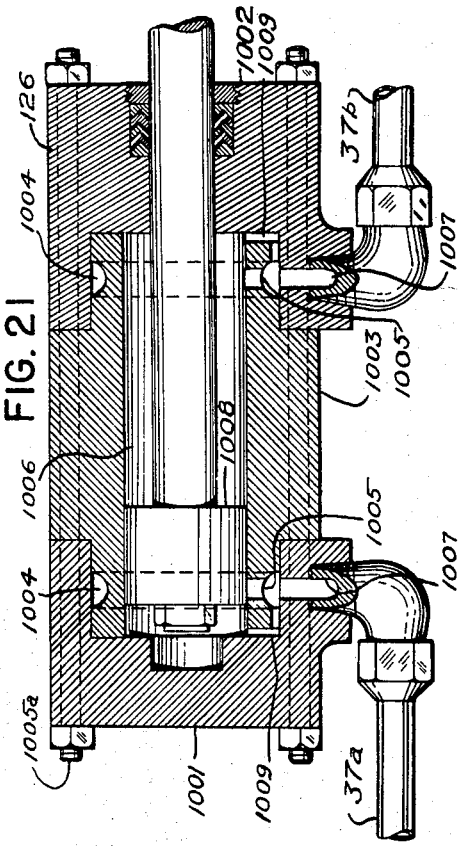
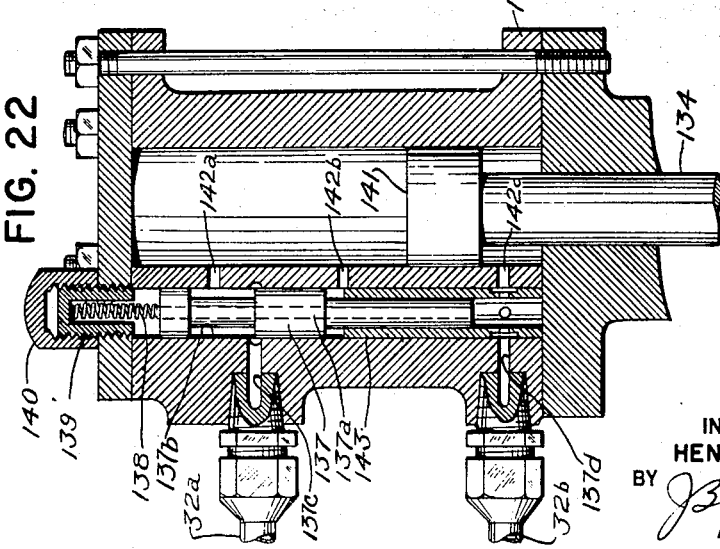
INVENTOR
HENRY H. WHEELER
BY
*J Bradley Cohn*
ATTORNEY Oct. 18, 1960 H. H. WHEELER 2,956,567
CIGAR MACHINE
Original Filed Nov. 26, 1946 18 Sheets-Sheet 18

INVENTOR
HENRY H. WHEELER
BY Joseph Shea
ATTORNEY ated Oct. 18, 1960

2,956,567
CIGAR MACHINE

Henry H. Wheeler, Bellerose, N.Y., assignor to International Cigar Machinery Company, a corporation of New Jersey Original applications Nov. 26, 1946, Ser. No. 712,456, now Patent No. 2,667,173, dated Jan. 26, 1954, and Ser. No. 359,752, May 19, 1953, now Patent No. 2,805,665, dated Sept. 10, 1957. Divided and this application June 27, 1957, Ser. No. 668,551

18 Claims. (Cl. 131—21)

This invention relates to cigar machines, more particularly to hydraulically operated cigar machines.

This application is a divisional of my co-pending application, Serial No. 359,752 filed May 19, 1953, now Patent No. 2,805,665 issued September 10, 1957, which was itself a division of my co-pending application, Serial No. 712,456 filed November 26, 1946, now Patent No. 2,667,173 issued January 26, 1954.

One of the main objects of the invention is to simplify the construction of cigar machines and reduce their weight and cost. Since my machine has no heavy and expensive cams, there is a considerable reduction in cost and weight. Other savings in weight and cost are obtained by elimination of shafts for supporting the cams, elimination of frames for supporting the cam shafts, elimination of gears, and elimination of driving connections. Accordingly, my machine may have a weight approximately one-half the weight of prior cigar machines and its cost may be considerably less.

Due to the fact that the various units of my machine are supported upon a single table, and are rearranged to save space, my machine occupies approximately five-eighths of the floor space required for a previous type of machine.

The various units of my cigar machine, except the operating mechanisms of the wrapper applying mechanism and the control mechanism for the cigar re-rolling mechanism, may be operated by separate fluid-operated devices controlled by fluid delivered under pressure from a source of fluid under pressure such as a hydraulic pump. Since the various units of the cigar machine are operated by separate fluid-operated devices, there is considerably less danger of injury of the attendant by moving parts. With separate fluid-operated devices for actuating the various units the forces imparted to the moving parts to operate the same are of such a controlled and limited magnitude that no injury to the attendant will result from manual obstruction thereof, except in the case of the crimper jaws.

With mechanically driven units, which are now used on cigar machines, the moving parts may injure the attendant if obstructed; because the momentum of the entire machine must be overcome to stop any moving part which is obstructed. Although mechanism for stopping the entire machine has been heretofore provided to prevent injury in the event any of its parts are manually obstructed, the momentum of the considerable weight of the moving parts of a mechanically driven cigar machine prevents instantaneous stoppage. To obtain the same degree of safety on a mechanically driven cigar machine as on my machine a safety device would be required for most units, which would be complicated and expensive.

While the wrapper transfer mechanism and the wrapper applying mechanism of my hydraulically operated machine are mechanically driven for reasons of simplicity due to the inherent intricacy of hydraulic mechanisms for this purpose, it is preferable to provide an automatic device for disconnecting the operating mechanism of the wrapper transfer from its mechanical drive when the movement of the wrapper transfer is obstructed. A further object of the invention, therefore, is to provide an automatic safety device for this purpose.

Another object is to provide a simplified mechanism for forming cigar bunches from bunch charges separated from a compacted tobacco column produced by assembling bunch length sections severed from the stream of filler tobacco advanced in the filler feed channel. To this end the bunch rolling apron may be raised to support the lower end of the column while a bunch charge is being cut from the lower end of the column, and the apron is then lowered and the bunch charge is rolled upon itself within a loop of the apron and rolled within a binder to form a cigar bunch. Heretofore, it was necessary to move the bunch charge after separation from the column, on to the bunch rolling apron with the possibility of disturbing the tobacco in the bunch charge.

Still another object of the invention is to improve the operation of the mechanism for intermittently feeding the continuous layer or stream of filler tobacco into the column-forming means. On prior cigar machines, when the continuous stream of tobacco was advanced in the filler feed channel into the column-forming means for severance of bunch length sections from its leading end, detectable variations in the length of the severed sections resulted from variations in the mass or load of the filler tobacco in the filler feed channel. Since the filler tobacco in the filler feed channel is laid therein manually by the attendant, there may be considerable variations in the amount of the same. As a result, I believe, the friction created against the side belts, which are backed up by rigid plates, by the portion of the tobacco stream which is compacted by the compactor will vary considerably. This causes more or less springing in the motivating members driving the belts and a variation in the charge of bunch length. In a cam operated machine it is not always possible to eliminate springing, as the cams are often some distance from the point where force is applied. In a hydraulic mechanism it is possible to obtain motion of the belts without springing as the hydraulic motor can be so placed that no springing is possible. Thus, bunch length sections of more uniform length will be severed for assemblage into a column from which the bunch charges are separated.

In prior machines of the type wherein bunch charges were separated from a vertical tobacco column formed by superimposing bunch length sections, the column was compacted by a compactor engaging the upper end of the column and mounted on a reciprocable member and pressed against the top of the tobacco column by a compression spring. When the height of the tobacco column varied due to delivery thereto of bunch length sections of varying thickness, the spring urging the compactor against the column was compressed to a greater or lesser extent and the density of the tobacco column varied at least to some extent in accordance with its height. Therefore, cigar bunch charges varying somewhat in density were separated from the column and these variations might be great enough at times to affect the density of the cigars formed from the bunch charges. One object of the invention, therefore, is to avoid variations in the density of the compacted tobacco column from which the bunch charges are separated. For this purpose the member compacting the tobacco column is hydraulically operated by connecting it to the piston rod of a hydraulic cylinder. The hydraulic cylinder is provided with instrumentalities for maintaining an unvaried fluid pressure on the piston of the hydraulic cylinder to maintain the pressure applied to the tobacco column constant and thereby permit bunch charges of uniform density to be separated from the tobacco column. Without such instrumentalities the pressure applied to the tobacco column would vary in accordance with the resistance of the column up to a maximum pressure determined by the pressure of the fluid supplied to the hydraulic cylinder.

Still another object of the invention is to permit variation of the pressure applied to the tobacco column for compaction thereof. The instrumentalities referred to are manually adjustable to regulate the pressure applied to the tobacco column.

If desired, the cutter for severing the bunch length sections may be integral with the compactor for the tobacco column. In this case the instrumentalities for regulating the pressure in the hydraulic cylinder may be constructed to apply a greater pressure to the piston in the hydraulic cylinder during the severance of the bunch length section and then reduce the pressure applied thereto during the compaction of the tobacco column.

A further object of the invention is to provide simplified mechanism for forming the loop in the apron. The rider plate forms a part of this mechanism and serves the dual purpose of forming a loop in the apron and holding down the bunch charge while it is being spirally rolled upon itself as the loop is advanced along the bunch rolling table. As the loop is farther advanced along the bunch rolling table the rolled bunch charge is rolled within a binder previously positioned on the rolling apron to form a cigar bunch.

Still another object of the invention is to provide a simplified mechanism for crimping or permanently shaping the ends of the cigar bunch, the bunch being delivered to this mechanism from the bunch rolling apron. In this connection, a further object of the invention is to hydraulically operate the bunch crimping mechanism. In prior mechanically operated crimper mechanisms, breakage of the cam levers operating the same resulted from accumulation of several cigar bunches in the crimper jaws due to failure of the bunch transfer to remove the same. With my hydraulically operated crimper mechanism the crimper jaws will not close sufficiently to cause breakage when several bunches accumulate therein, because the motion thereof will be stopped when the presence of several bunches in the crimper jaws provides a resistance which exceeds the force applied by hydraulic pressure to the crimping mechanism.

Another object of the invention is to axially locate the cigar bunch after it is delivered from the bunch rolling apron. Due to accumulation of paste on portions of the rolling apron after its rubber coating has worn off the operation of the apron may be sufficiently affected to displace the cigar bunch axially from the position in which it should be delivered prior to being transferred to the crimper mechanism. To assure proper location of the bunch axially there is provided mechanism for displacing the cigar bunch into the proper axial position either toward its head end or its tuck end after it is delivered from the rolling apron and before it is transferred to the crimper mechanism.

The various bunch transfers for transporting the cigar bunch to the various mechanisms and the cigar transfer for transferring the cigar from the wrapper-applying device to the re-rolling mechanism, are hydraulically operated. Therefore, if obstructed, manually or otherwise, their motion will be stopped and they can be reset to the proper position by stops arranged to engage them at the ends of their strokes. However, if either the cigar transfer or the bunch transfer for transporting the bunch to the wrapper-applying mechanism from the crimper mechanism should be obstructed and displaced from their proper positions, they will collide with the mechanism for operating the wrapper transfer. It is still another object of the invention to prevent damage to the same by stopping the motor driving the machine in the event these transfers are obstructed and displaced from their proper positions.

In the case of the re-rolling mechanism a further object of the invention is to arrange the re-rolling drum in a position wherein it can be readily removed. For this purpose, the re-rolling drum is hydraulically operated. The use of hydraulic mechanism permits arrangement of the drum in a position facing the outside of the machine. Therefore, the drum can be readily removed.

With these and other objects not specifically mentioned in view, the invention consists in certain constructions and combinations which will be hereinafter fully described.

In the accompanying drawings, which form a part of this specification, like characters of reference indicate the same or like parts.

For conveniently locating the different figures of the drawings on the various sheets, reference may be had to the following list of the figures of the drawings and the sheets whereon they appear:

| | |
|---|---|
| Fig. 1 | Sheet #1 |
| Fig. 2 | Sheet #2 |
| Fig. 3 | Sheet #3 |
| Figs. 4, 5, 6, 25, 26 | Sheet #4 |
| Fig. 7 | Sheet #5 |
| Fig. 8 | Sheet #6 |
| Figs. 1A, 1B, 8A, 8B, 8H | Sheet #7 |
| Figs. 8C, 8D, 8E, 8F, 8G | Sheet #8 |
| Fig. 9 | Sheet #9 |
| Fig. 10 | Sheet #10 |
| Figs. 10A, 11, 12 | Sheet #11 |
| Fig. 13 | Sheet #12 |
| Figs. 14, 15 | Sheet #13 |
| Figs. 16, 17 | Sheet #14 |
| Figs. 18, 27 | Sheet #15 |
| Fig. 19 | Sheet #16 |
| Figs. 20, 21, 22 | Sheet #17 |
| Figs. 23, 24 | Sheet #18 |

Figs. 1A and 1B are sectional and end elevation views, respectively, of the safety device through which the wrapper-applying device is driven from the motor driving the hydraulic pump;

Fig. 7 is a perspective view of the filler feed showing a portion of the bunch rolling table and the hydraulic circuits for same, certain portions thereof being broken away;

Figs. 8A and 8B are sectional views of the hydraulic motor operating the bunch rolling apron and showing the motor in two different positions;

Figure 25:
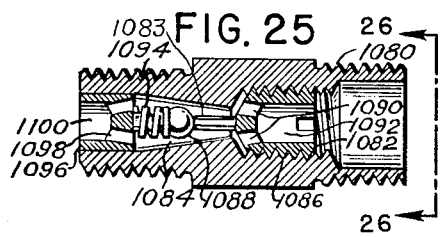
Figure 26:
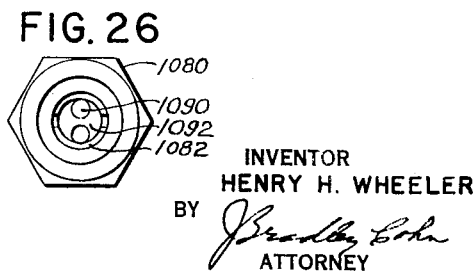
Figure 10:
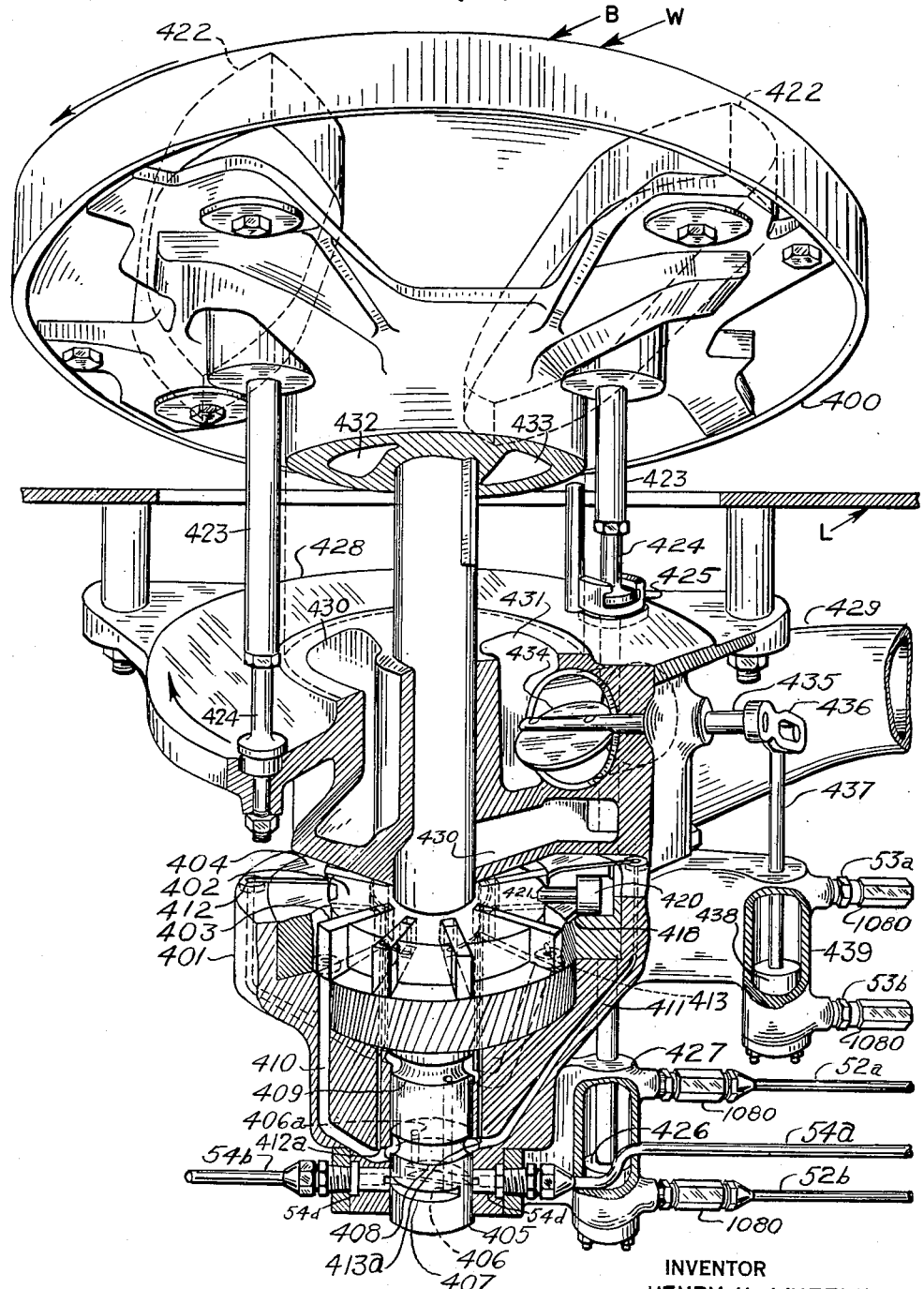
Figure 11:
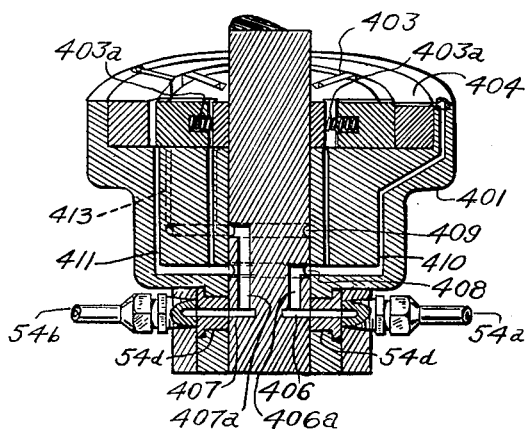
Figure 12:
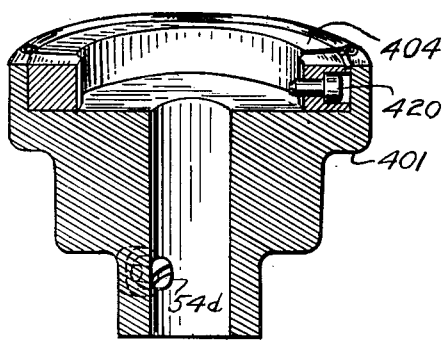
Figure 10:
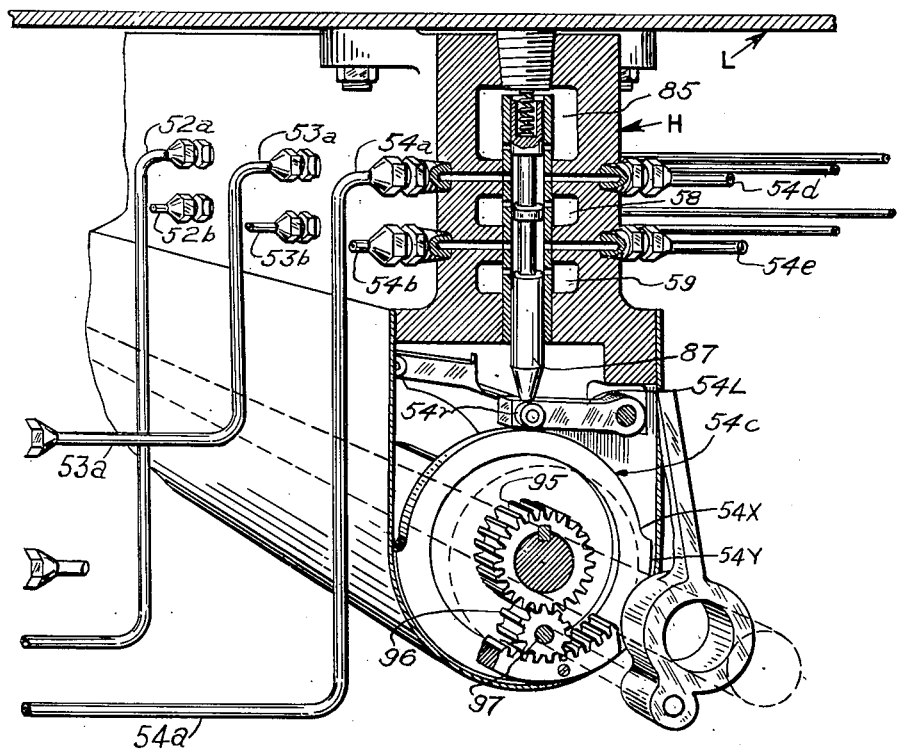
Figure 13:
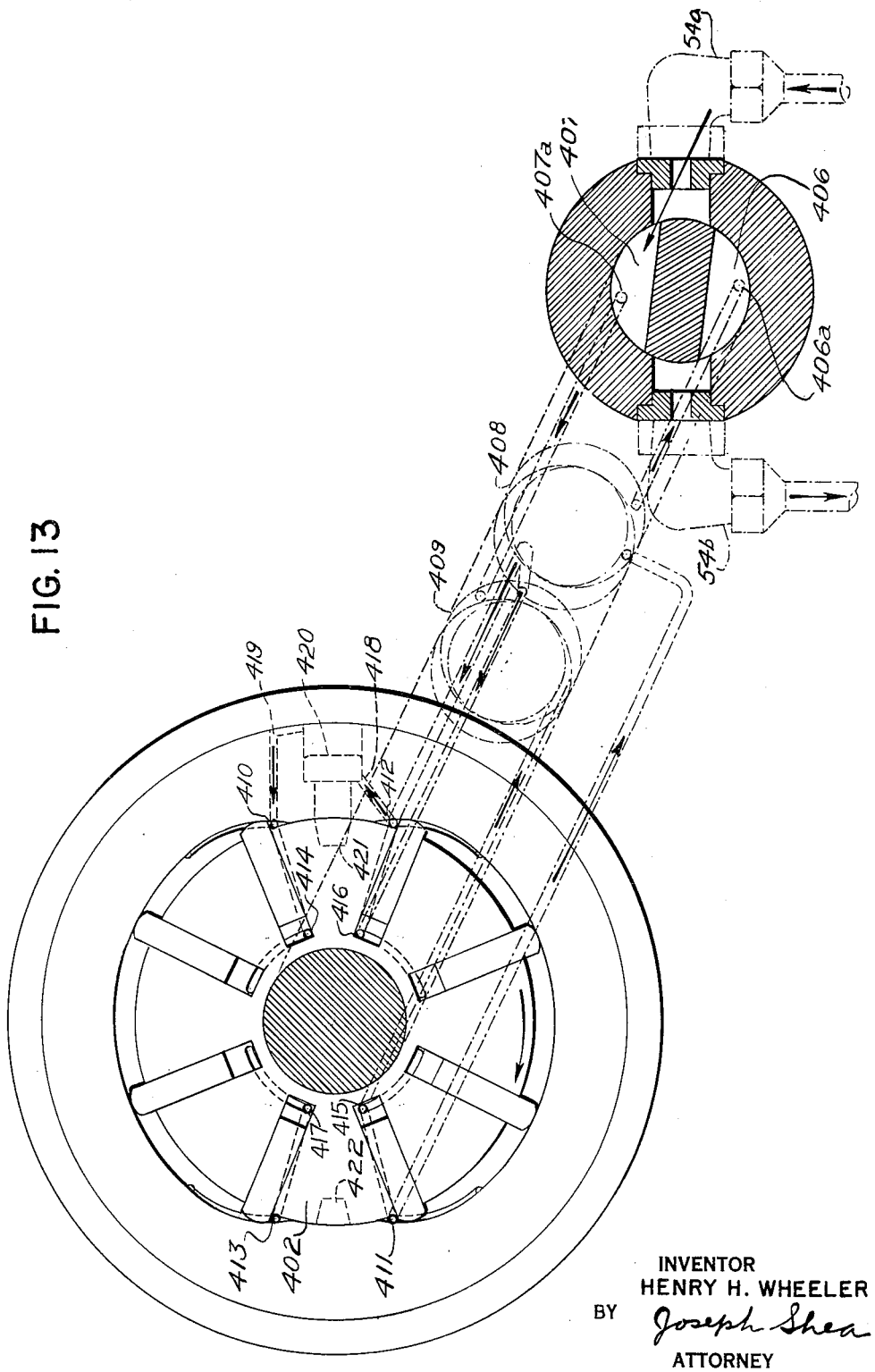
Figure 19:
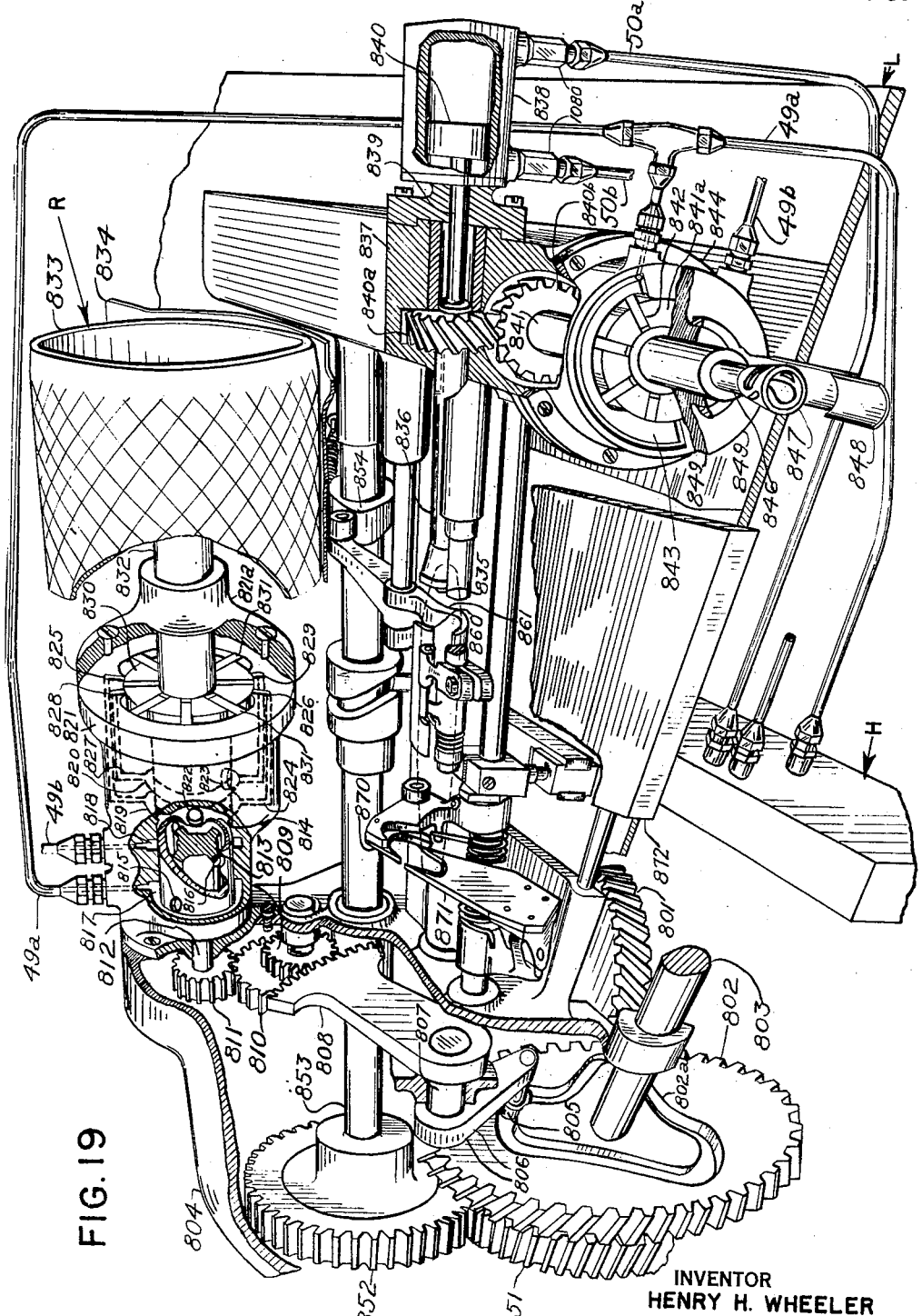
Figure 24:
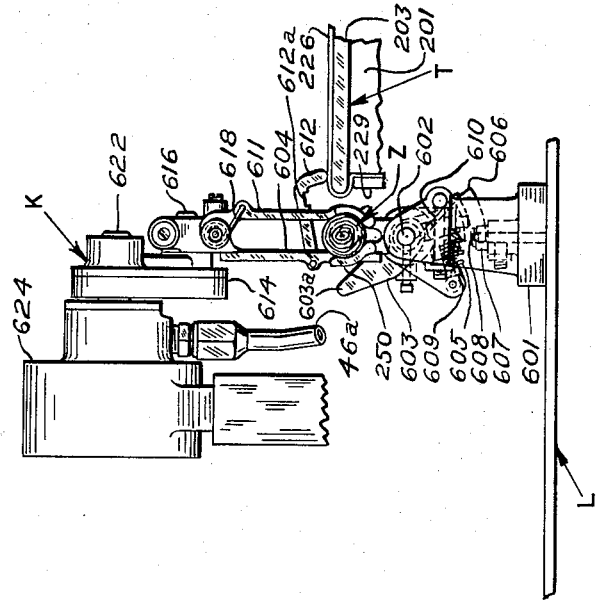
Figure 23:
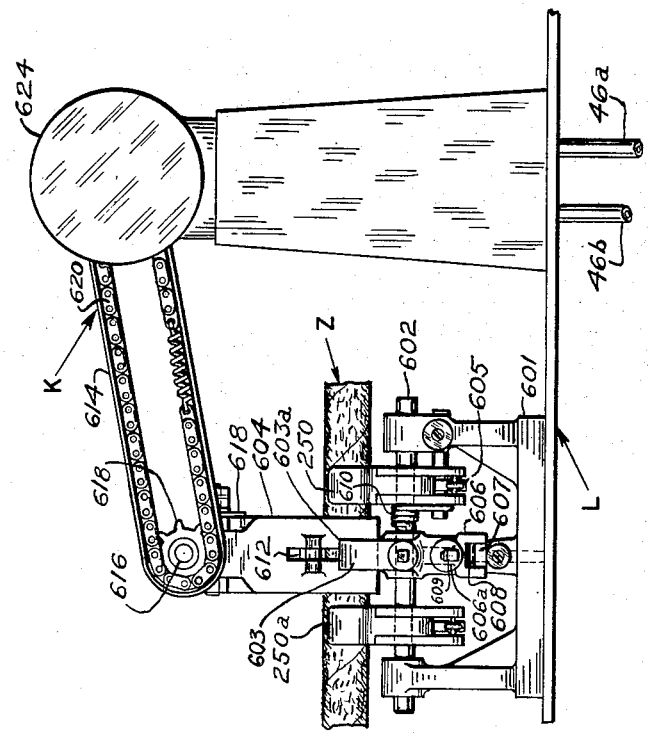

Figs. 8C to 8G inclusive, are detail side elevations of the rider plate showing it in various positions wherein it forms the loop in the bunch rolling apron and serves to hold down the bunch charge while it is being rolled upon itself;

Fig. 8H is a detail view showing the arrangement of the diametral ports of the rotor of the motor operating the bunch rolling apron;

Fig. 9 is a perspective view of the binder transfer showing the portion thereof above the table and the hydraulic circuits and mechanism below the table for operating the same;

Fig. 10 is a perspective view of the binder die turret showing the fluid-operated mechanisms located below the table for indexing the turret, applying suction to the binder-cutting beds, and lifting the suction head at the binder-cutting station. The hydraulic motor for indexing the turret is broken away to expose certain parts thereof;

Fig. 10A is a perspective view showing the remainder of the hydraulic circuit for operating the fluid-operated mechanisms illustrated in Fig. 10 and the master valve controlling the hydraulic motor for indexing the binder die turret;

Fig. 11 is a sectional view of the hydraulic motor for indexing the binder die turret;

Fig. 12 is a sectional view of the housing of the indexing motor;

Fig. 13 shows a diagrammatic view of the turret indexing motor showing the direction of oil flow through the same;

Fig. 14 is a side elevation of the binder paster. It also shows the hydraulic circuit for the same with a sectional view of its master valve;

Fig. 15 is an end view of the binder paster;

Fig. 16 is a side elevation of the crimper illustrating its circuit and its master valve, and a portion of the bunch transfer which delivers the cigar bunch to the crimper;

Fig. 17 is an end elevation of the crimper showing its hydraulic circuit and master valve, and a portion of the bunch transfer;

Fig. 18 is a perspective view of the cigar bunch transfer for transporting the bunch from the crimper to the wrapper-applying mechanism and the cigar transfer delivering the cigar to the re-rolling mechanism. This view also shows the hydraulic motors operating these transfers and the safety switches;

Fig. 19 is a perspective view of the re-rolling and knurler mechanisms showing the hydraulic circuits for the same;

Fig. 20 is a longitudinal sectional view on an enlarged scale of the piston stroke limiting device used on the binder transfer;

Fig. 21 is a longitudinal section on an enlarged scale of one of the hydraulic cylinders which is provided with an oil cushioning system;

Fig. 22 is a longitudinal sectional view on an enlarged scale of the hydraulic cylinder for operating the bunch length cutter. This view illustrates the mechanism for maintaining a constant pressure on the piston of the hydraulic cylinder;

Figs. 23 and 24 are side and end elevations, respectively, of the bunch locator and the transfer which carries the cigar bunch from the bunch rolling apron to the crimper;

Fig. 25 is a longitudinal section of one of the throttling valves;

Fig. 26 is an end elevation of the same taken from the line 26—26 of Fig. 25; and Fig. 27 is a wiring diagram showing the connection of the limit switches illustrated in Fig. 18 with each other and the relay coil of the magnetic switch controlling the electric motor driving the machine.

The hydraulic cigar machine selected to illustrate the invention includes the following components which correspond to similar units of prior mechanically driven cigar machines. These units or assemblies are visible above the supporting table L of my machine and are all hydraulically operated in properly timed relationship with the exception of the wrapper applying mechanism.

The filler feed F (Figs. 1 and 7) which may be considered as the first hydraulically operated unit, is provided with a cross feed including two vertical intermittently traveling belts 99 and one intermittently traveling horizontal belt 100. The upper run of the horizontal belt and the inner runs of the vertical belts form a filler feed channel in which filler tobacco is manually laid to form a layer of tobacco which is advanced into a measuring chamber or magazine where bunch length sections are cut off from the leading end of the tobacco layer. The severed bunch lengths are superimposed in the measuring chamber to form a column which is compacted to a predetermined density, and bunch charges are separated from the compacted column and transferred to a bunch rolling table T (Fig. 1), upon which the bunch charge is rolled or wrapped within a binder to form a cigar bunch. The filler feed F, bunch rolling table T and other units of my machine will be described in detail following the general description of the cigar machine.

Binder cutting mechanism (Fig. 1) is another hydraulically operated unit and consists of an intermittently rotating turret B on which there are two dies on which binders are cut from binder leaf tobacco manually placed thereon, by binder-cutting rollers 445 which are moved over the dies at the proper time by mechanism hereinafter described. It may be noted that in my machine the binder turret B is arranged within the outline of the table L and that the various units have all been arranged on the table L, so that no auxiliary tables are required. Therefore, a considerable saving of floor space over previous cigar machines is obtained. My machine requires only approximately five eighths of the floor space required by previous machines.

Another fluid-operated unit is the binder transfer M (Fig. 1) which picks up the binders at the proper time and transfers them to the rolling table T. This binder transfer consists of an arm swinging about a vertical axis and having on its free end a pivotally mounted binder carrier which picks up the binder from the binder turret and transfer it to the rolling table T.

Figure 1:
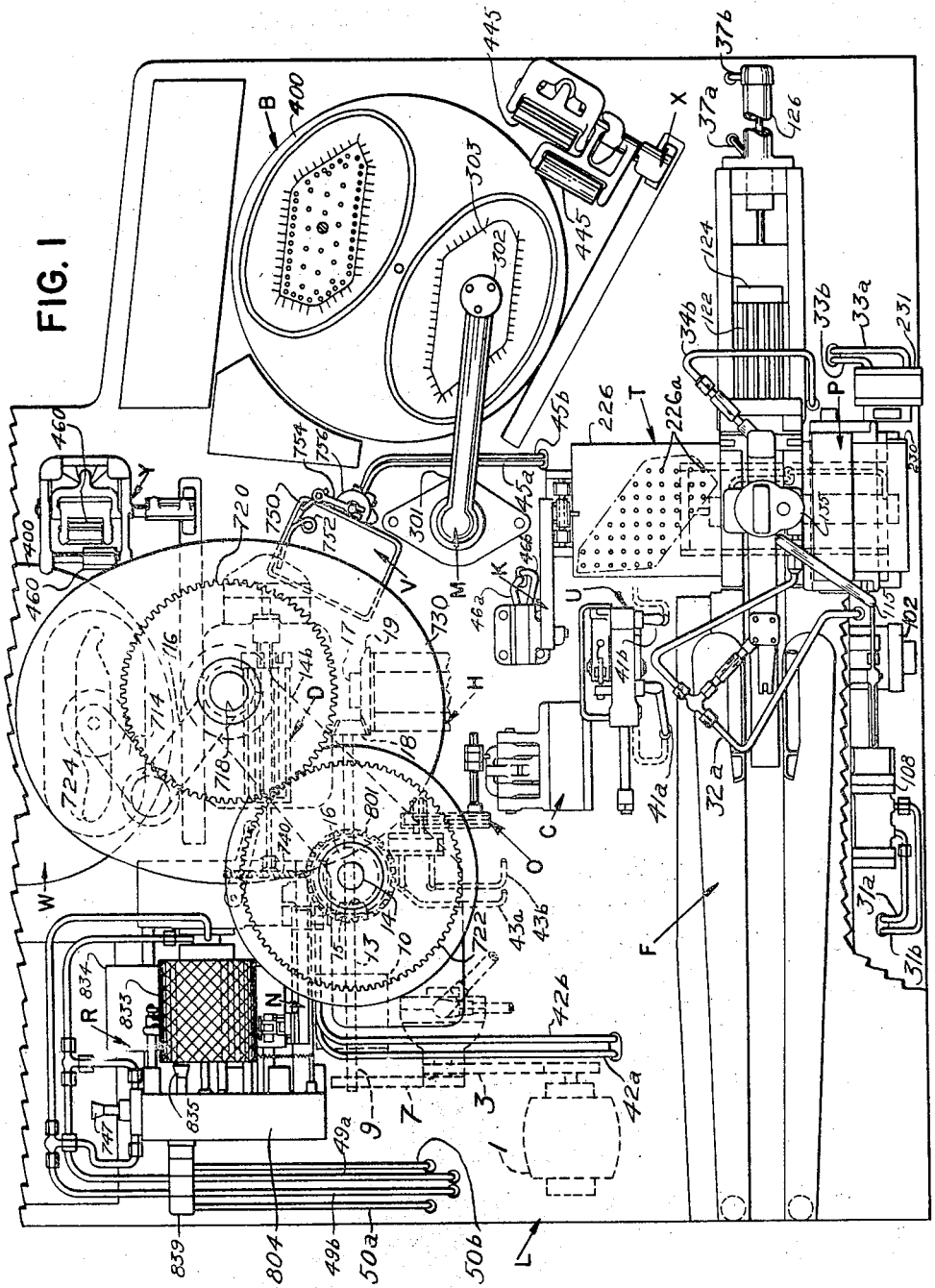
Fig. 1 is a plan view of a hydraulic cigar machine exemplifying my invention and showing in their proper position relative to each other all main components or assemblies which are visible above the table of the cigar machine.

Another unit is the binder paster U which is hydraulically operated and consists of a paste pot filled with paste and mechanism which transfers paste from the pot to a predetermined portion of the binder deposited on rolling table T. Rolling table T is provided with a rolling apron and a sliding carriage on which is pivoted a device for operating the rider plate (Fig. 1). At the proper time the bunch charge delivered from the filler feed F is rolled upon itself within a loop formed in the apron by the rider plate and then rolled within the binder to form a cigar bunch the paste applied by the binder paster U assisting in holding the binder on the bunch.

Another unit K known as a bunch transfer (Fig. 1) is also fluid-operated and carries the cigar from the bunch rolling table T to the crimper C (Fig. 1).

The crimper C is another fluid-operated unit and comprises two pairs of jaws between which the ends of the cigar bunch are inserted by the bunch transfer K. When these jaws close, the ends of the bunch are compressed into the proper shape.

A bunch transfer O (Fig. 1) is also fluid-operated and provided with fingers which grip the bunch and deliver it to the wrapper-applying device. At this point, especially in connection with the bunch transfers, it should be mentioned that one of the advantages of my hydraulically operated machine is that in case of obstruction of the bunch transfers by some object or the operator's body, no injury to the operator or machine will result; since only sufficient power with a small additional margin is supplied to operate the unit. Thus, obstruction of any unit will simply cause oil flow to cease to that unit for the time being. In the case of obstruction of a unit equipped with a mechanical drive, it is likely that the operator would be injured or that the machine would be broken.

On the wrapper cutting mechanism (Fig. 1), which constitutes another fluid-operated unit, a wrapper has been cut at the proper time. This mechanism includes a turret W which is provided with a pair of wrapper-cutting dies and intermittently turned similar to the binder die turret. The cutter roll carriage Y supports cutter rollers 460 which coact with each die successively at one station of the turret to cut wrappers from leaf tobacco manually positioned on the die at the other station of the turret.

The wrapper transfer picks up the cut wrapper from the die at the cutting station and carries it in a predetermined path to the wrapper-applying device D. While being transferred along said path the wrapper passes over the wrapper paster V. This wrapper transfer is similar to the wrapper transfer shown and described in my Patent No. 2,235,857 issued March 25, 1941 and is mechanically driven in the same manner shown in said patent.

The wrapper paster V is another hydraulically driven unit, and consists of a paste pot and a paste applicator or grid. This applicator dips into the paste pot and then rises and applies paste in a certain pattern to the flag end of the wrapper being carried to the wrapper-applying device by the wrapper transfer.

The wrapper-applying device D operates to remove the wrapper from the wrapper transfer and wind it spirally about a cigar bunch previously delivered to the wrapper-applying device by the transfer O. The wrapper-applying device is mechanically driven and is similar to the wrapper-applying device shown and described in the Durning Patent No. 2,290,171 issued July 21, 1942. The wrapper transfer is provided with a device, not shown in Fig. 1 but shown in Fig. 2 which includes a hydraulic cylinder 780 operating on air cylinder 788 connected to mechanism (not shown) to blow the flag end of the wrapper down from the wrapper transfer at the proper time. After the flag end of the wrapper is blown down from the wrapper carrier it is slit and wound about the head end of the cigar bunch. This device also includes an air line and a valve which are hydraulically operated at the proper time and will be fully described hereinafter.

The cigar transfer N, which is also hydraulically driven, operates at the proper time in the machine cycle to transfer the cigar from the wrapper-applying device to the re-rolling mechanism R which constitutes another hydraulically operated unit of the machine.

The re-rolling mechanism R includes an oscillating drum 833 which is hydraulically driven and coacts with a stationary concave to roll back and forth a cigar introduced therebetween by the cigar transfer N. The re-rolling mechanism also includes two revolving knurlers which are hydraulically driven and engage and serve to smooth the ends of the cigar, and cutoff knives which trim the tuck end of the cigar. Except for the hydraulic drives for the re-rolling drum and the knurlers the present re-rolling mechanism is similar to the re-rolling mechanism disclosed in my Patent No. 2,337,076 issued December 21, 1943.

All these units are located above the table L, (Fig. 1). Certain mechanisms, such as the drive, the master valve and the piping are located under table L, but these require little space and are so arranged that there is plenty of room for cleaning of the floor and maintenance of the machine.

Drive

The drive for my machine (Figs. 1, 1A, 1B, 2, 3 and 18) is provided with an electric motor 1 carrying a pulley 2 on its shaft. A belt 3 is driven from pulley 2 and drives a pulley 4 (Figs. 1A and 1B) which is loosely mounted on a sleeve 21 keyed on the shaft 22 of a pump 6. The sleeve 21 has a flange 23 against which is seated a ring 24 formed of suitable friction material and interposed between the pulley 4 and flange 23. A clutch pulley 5 is threaded on the sleeve 21 and held in driving engagement with pulley 4 by a torsion spring 20a. One end of torsion spring 20a is anchored in a lock nut 25 threaded on sleeve 21, and the other end of spring 20a is anchored in pulley 5. Thus, the pulley 4 will be pressed against the friction material 24 to drive shaft 22 and operate pump 6, and pulley 5 will be driven. A belt 7 on pulley 5 drives pulley 8 on reduction drive shaft 9. The shaft 9 drives reduction gearing of the well known planetary type enclosed in housing 10. The output shaft 13 of the reduction gearing drives the vertical drive shaft 14 (Figs. 1 and 18) of the operating mechanism of the wrapper transfer through bevel gears 15 and 16. Bevel gear 16 is also fragmentarily shown in Fig. 2 meshing with gear 15. Shaft 13 also drives the master valve cam shaft 17 through bevel gears 18 and 19, bevel gear 18 not being visible in Fig. 2, but both gears 18 and 19 being shown in Figs. 1 and 3 meshing with each other. The wrapper-applying device D is driven from the shaft 14, and the re-rolling mechanism R is controlled from shaft 14, in a manner which will be hereinafter described.

When the operating mechanism of the wrapper transfer is obstructed in any manner, manually or otherwise, the pulley 5 will unscrew itself from engagement with pulley 4 and the rotation of the shaft 22 of pump 6 and the rotation of shaft 14 will be stopped. Therefore, the operation of the wrapper transfer, the wrapper-applying mechanism and the various units controlled by the fluid circulated from pump 6 will be interrupted.

There is provided a brake 20 (Figs. 1A, 1B and 2) having a handle 26 fastened on a shaft 27 suitably supported from table L. On shaft 27 is secured a brake piece 28 to which is pivotally connected a brake piece 29 whose free end engages a yoke 30 secured on shaft 27. The brake pieces 28 and 29 enclose a circumferential flange on pulley 5 and normally permit it to rotate freely. When the handle 26 is pulled downwardly the circumferential flange on pulley 5 is gripped by the brakepieces 28 and 29 and the pulley 5 will be unscrewed from the position wherein it engages pulley 4. When handle 26 is released by the operator, the torsion spring 20a shown in Figs. 1A and 1B will cause the pulley 5 to be screwed into engagement with pulley 4 and the operation of the machine will be resumed.

Master valves

Figure 5:
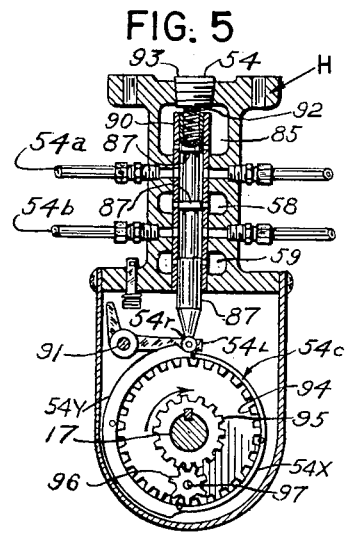
Fig. 5 is a sectional view of one of the valves taken on the line 5—5 of Fig. 4.
Figure 6:
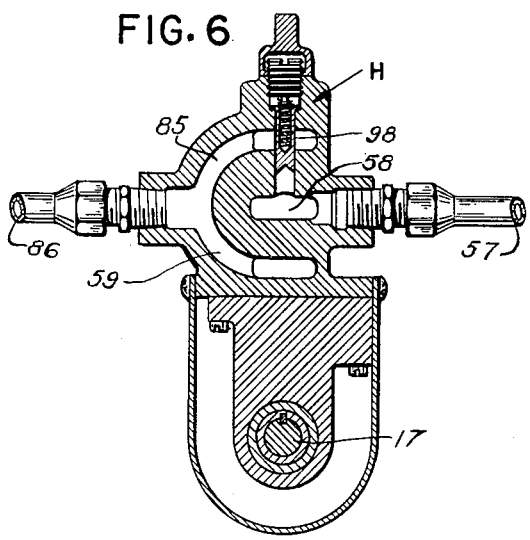
Fig. 6 is a sectional view of the master valve housing on line 6—6 of Fig. 4.

The hydraulic pump 6, which may be a vane type pump of conventional construction, is supplied with oil by pipe 55 from an oil reservoir 56 (Fig. 2) wherein it is filtered by filter 56a. The oil is delivered by pump 6 under pressure through a pipe 57 to a cored out chamber 58 in the master valve housing H (Figs. 3–6). This cored out chamber runs the entire length of the valve housing and feeds oil to each of twenty-four four-way master valves numbered 31–54 inclusive. Other cored out passages 59 and 85 in this housing, which communicate with each other as shown in Fig. 6, receive the exhausted oil from these valves and return it to reservoir 56 through pipe 86.

Each four-way valve is of a well known type, its function being to feed fluid to either side of a fluid motor, as desired, and to return the fluid from the opposite side of the fluid motor to the reservoir or sump 56. Each of the valves 31–54 inclusive is provided with a stationary sleeve 90 secured in housing H. In sleeves 90 are slidably mounted spool-shaped members 87. Members 87 are provided on their central and end portions with heads which have a diameter greater than the rest of member 87, as is shown in the case of valve 54 in Figs. 5 and 10A, the valve 41 in Fig. 14, and the valve 42 in Fig. 18. Each valve sleeve 90 has five pairs of opposed slots which are so spaced that three pairs of slots, which communicate with the passages 58, 59 and 85, are normally closed by the heads on valve spool 87. The lower ends of valve spools 87 are tapered and rest on cam levers 31L–54L inclusive, which carry cam rollers 31R–54R inclusive, which engages cams 31C–54C inclusive, secured on cam shaft 17. The cam levers 31L–54L inclusive, are mounted on a shaft 91 supported in the master valve housing H, and springs 92 seated in sockets in the upper ends of valve spools 87 and engaging plugs 93 threaded into the master valve housing, keep the cam rollers of these levers in engagement with cams 31C–54C inclusive.

It will be apparent that if the valve spools 87 are slightly raised or lowered that oil will flow under pressure from chamber 58 through the central pair of slots in sleeve 90, which are normally closed by the central head of the valve spools 87, out a lower or upper intermediate slot to return through the other upper or lower intermediate slot, respectively, and thence through either the uppermost or lowermost pair of slots in sleeve 90, which are normally closed by the upper or lower head of spools 87, into either the chamber 59 or chamber 85. Thus, the oil flowing from chamber 58 through the slots in sleeve 90 opened by the central head will also be delivered through either pair of slots in sleeve 90 intermediate the central and the outermost slots into ports formed in the sides of the main valve housing H and communicating with the intermediate slots in sleeve 90. These ports are connected by pipes, as for example 54a and 54b, to a hydraulic motor or cylinder, as will be hereinafter described, so that the oil will flow through one pipe into the motor or cylinder and be returned by the other pipe to either the chamber 59 or 85.

There are twenty-eight pairs of pipes connected to the ports in the sides of the master valve housing H. A pair of pipes leads from each pair of these ports to each of the respective hydraulic motors or cylinders which operate various mechanisms, with the exception of valves 51, 52, 53 and 54. These four valves have two pairs of pipes for each valve to supply oil to the two die turrets which are simultaneously indexed by 180 degree steps, the suction head lifter of each turret, the suction control for each turret, and the roller cutters of each turret.

A relief valve 98 of conventional construction (Fig. 6) allows oil to escape from pressure chamber 58 into the exhaust chamber 85 when the oil pressure in chamber 58 becomes excessive and thereby maintains the oil pressure in chamber 58 below a predetermined maximum. The portions of the chambers 59 and 85 adjacent pipe 86 communicate with each other, as shown in Fig. 6, to provide a common outlet into pipe 86.

Reduction gearing (Figs. 4, 5 and 10A) including a ring gear 94 secured to cam 54C, a pinion 95 keyed on cam shaft 17, and an intermediate gear 96 mounted on a stub shaft 97 supported in housing H, is provided for driving the cam 54C at one-half the speed of shaft 17. The other cams 31C–53C inclusive, are secured to shaft 17 and are revolved at the same speed as shaft 17.

*Cross feed, column forming, and charge measuring and severing*

Referring now to Fig. 7 of the drawings wherein is illustrated the filler feed of my cigar machine, the filler feed includes a cross feed provided with two side belts 99 and one bottom belt 100 arranged to form a filler feed channel in which stemmed leaf tobacco is manually placed to form a continuous layer of tobacco. Each of the belts 99 is trained about a driving pulley and an idler pulley, and both driving pulleys are driven from shaft 101 through two pairs of bevel gears, one pair of bevel gears being shown in Fig. 7. One of these bevel gears is secured on shaft 101 and meshes with and drives a bevel gear on an upright shaft carrying one of the driving pulleys. The other pair of bevel gears (not shown) also consists of a bevel gear on shaft 101 driving a bevel gear on an upright shaft carrying the pulley driving the other belt 99. A drum 101a secured on shaft 101 and shown in Fig. 7 drives the belt 100 which is looped over a series of idler pulleys to provide a horizontal run extending along the lower edges of belts 99. Since the construction of the filler feed channel and the arrangement of the bevel gears for driving the pulleys of belts 99 is conventional and shown in my Patent No. 2,311,011, issued February 16, 1943, further description thereof is deemed unnecessary.

Attached to the outer end of shaft 101 is a drum 102 having a concentric internal bore. A four-toothed ratchet 103 loosely mounted on shaft 101 and provided with rollers 104 mounted in recesses of the ratchet to engage drum 102, and a gear 105 attached to the hub of ratchet 103, form a roller clutch of conventional construction. Meshing with and driving gear 105 is a rack 106 cut in the end of a piston rod 107 protruding from the hydraulic motor 108. The post 106a extending upwardly from rack 106 engages one side of a flange on a sleeve 109 slidably mounted on a valve rod 110 which also protrudes from motor 108. Inside sleeve 109 is provided a spring 116 attached at one end to valve rod 110 and attached at its first other end to a bar 112 which is fastened to sleeve 109. When nuts 112a threaded on bar 112 are engaged by post 106a during the outward movement of rack 106, the spring 116 will be stretched in a manner hereinafter described. Bar 112 is slidably mounted in the frame of the machine.

In the protruding portion of valve rod 110 are two annular grooves 110a and 110b properly spaced to be engaged by rocker arm 113 at the end of each stroke of the valve rod 110. The arm 113 is maintained in engagement with either of said annular grooves by a tension spring 113a and disengaged therefrom by a pin 114 on an arm 115 attached to and moving with cutter 133 on vertical reciprocating block 132, in a manner which will be presently described.

In the operation of my cross feed, pin 114 comes down and strikes rocker arm 113, disengaging same from the left hand groove 110a in the protruding portion of valve rod 110. Then spring 116 forces the valve rod 110 inwardly to displace the valve spool portion 119a thereof sufficiently to open port 117a leading from a chamber 117 communicating with pipe 31b to the left hand side of piston 118. Rod 110 remains in this position waiting for master valve 31, which is connected to pipe 31b to open at the proper time. In the meantime, pin 114 ascends and allows rocker bar 113 to engage the right hand annular groove 110b in the protruding portion of valve rod 110. At the proper time master valve 31 opens, allowing oil under pressure to pass through pipe 31b into the cored out chamber 117 in motor 108 and thence past valve spool portion 119a of rod 110 and through to the left hand side of piston 118. The piston 118 is thus displaced to the right, and the oil on the right side of the piston passes out of the cylinder and into the right hand port 117b. The spool valve portion 119b of valve rod 110 is in a predetermined position shown in Fig. 7 at this time to permit the oil flowing into the right hand port 117b to flow into a drilled passage 108a formed in motor 108 and communicating with pipe 31a and then back to master valve 31.

When piston 118 has moved far enough to the right for post 106a to strike nuts 112a threaded on rod 112, rod 112 is moved to the right sufficiently to stretch spring 116. Thus sleeve 109 is displaced to the right until the flange on this sleeve strikes a corner 120 formed on rocker arm 113 and raises arm 113 to disengage it from the right hand annular groove 110b in rod 110. The spring 116 which is now under tension, pulls valve rod 110 to the right, thereby reversing the oil flow from the left side of the piston 118 to the right side of the same while arm 113 engages the left hand annular groove 110a in rod 110. The oil now flows from chamber 117 through port 117b into the cylinder. This causes piston 118 to travel to the left, and as post 106a strikes the flange on sleeve 109, it compresses spring 116 so that it will be ready for the next cycle. The oil now displaced by piston 118 flows through port 117a into the passage 10a to be returned to valve 31, the valve spool portion 119a being in position to permit the oil to flow from port 117a to port 108a.

As rack 106 moves to the right with piston rod 107, gear 105 is rotated to run ratchet 103 and cause rollers 104 to drive drum 102 on shaft 101. Shaft 101 is thus driven in the proper direction to advance cross feed belts 99 and 100 to the right. The rack 106 when moving to the left, turns gear 105 and ratchet 103 in the opposite direction; but rollers 104 do not drive drum 102 and there is no motion of same. Since there will be no springing of the rack 106 when it drives shaft 101, despite variations in the friction of the belts 99 against rigid plates (not shown) which engage the inner sides of these belts to back up the same, the tobacco will be advanced by uniform increments and bunch length sections of uniform length will be separated from the leading end of the tobacco stream. Heretofore, variations in the amount of the filler tobacco manually laid in the filler feed channel would produce variations in the amount of friction between belts 99 and said plates along the portion of the filler stream which is compacted by mechanism hereinafter described. Therefore, variations in the friction of belts 99 against said plates would create different degrees of springing of the driving parts for these belts in prior machines and thus vary the length of the increment by which the tobacco stream is advanced and consequently produce variations in the length of the cut charges. For example, a certain amount of springing is inherent in a structure such as shown in Wheeler No. 2,311,011 where the feed belts are driven by lever 40 (Fig. 3 thereof), driven by a cam lever. Variations in belt friction produce variations of springing. This cannot occur in the rack 106 as the extent of its motion is controlled not by its drive means but by the stop 112a acting upon the drive means when the measured feed is made. Accordingly, the feed movement must be the same regardless of resistance.

Bunch length sections are severed from the layer of tobacco advanced by the belts 99 and 100 and assembled in a magazine 121 to form a vertical column of tobacco which is compacted to a predetermined density prior to separation of bunch charges from the lower end of the column. When magazine 121 has received a sufficient number of bunch length sections, pin 114 on arm 115 of block 132, which is controlled by mechanism hereinafter described, fails to go down far enough to release bar 113, and the feeding of the layer of tobacco by belts 99 and 100 stops until the level of tobacco in the magazine has been reduced. It will be seen from the above description that when nuts 112a are adjusted along bar 112 the length of the bunch length sections can be increased or diminished to suit the required cigar length, since the extent of the forward travel of the belts 99 and 100 is controlled by the position of nuts 112a.

Continuing with the description of the filler feed shown in Fig. 7, the layer of filler tobacco is advanced by the belt 100 into the upper portion of a measuring chamber or magazine 121 having side walls extending along the lateral edges of the belt 100 and across the rolling apron 226 hereinafter described. The leading end of the tobacco layer is fed between the side walls of magazine 121 and on to fingers 122. These fingers and the charge-cutting knife 123, which forms the bottom of magazine 121, are attached to a slide 124 guided by a frame 124a attached to the table L. Slide 124 is connected to a piston rod 125 projecting from cylinder 126. Master valve 37 opens to allow oil under pressure to flow through pipe 37a into cylinder 126 and displace piston 125 and slide 124 outwardly. Thus fingers 122 will be retracted and knife 123 will be pulled out from under the tobacco column which is formed in magazine 121 in a manner hereinafter described and supported on knife 123. Moreover, when slide 124 is moved outwardly, the leading end of the tobacco layer advanced on to the fingers 122 by belt 100 will be deposited on top of the vertical column of tobacco in magazine 121 while the tobacco column is supported on the bunch rolling apron 226 after withdrawal of knife 123.

The cam 37c operating valve 37 is so timed that after the leading end of the tobacco layer has been fed on to fingers 122, the valve 37 is lowered to place the pressure chamber 58 in communication through the upper intermediate pair of slots in sleeve 90 with the upper port in the side of the main valve housing, which is connected to the pipe 37a, to cause slide 124 to move outwardly. The oil so displaced by piston 125 will be returned by pipe 37b to chamber 59 through valve 37.

The charge-cutting knife 123 is guided by rails (not shown) extending underneath the knife along the longitudinal edges thereof. These rails are attached to the lower edges of swinging members 128 pivoted on brackets supported by frame 124a and lugs 121a on the side walls of the magazine 121. Members 128 are provided with upwardly extending lugs which are pivotally connected to a toggle 129 which is connected to a piston rod 130 protruding from cylinder 131.

Piston rod 130 is connected to a piston 130a in the cylinder 131. The flow of oil under pressure from chamber 58 of the main valve housing to pipe 34a, which communicated with the lower end of cylinder 131, is controlled by master valve 34 to lift the piston 130a and swing the members 128 outwardly when the knife 123 is withdrawn. The oil displaced in the cylinder 131 by the upward movement of piston 130a is returned through pipe 34b to the valve 34 which is then in position to permit the oil to flow into exhaust chamber 59.

On a block 132, which slides vertically between the side walls of the magazine 121, is formed a corrugated cutter 133 having a configuration corresponding to the desired shape of the head ends of the severed bunch lengths and the desired shape of the indentations in the tuck ends of the same. Block 132 has a series of vertical slots 132a extending up from its bottom and into which the fingers 122 project when they are moved inwardly and is attached to a piston rod 134 projecting from cylinder block 135. Cutter 133 coacts with a lower corrugated cutter or ledger plate 136, which has indentations fitting the configuration of cutter 133, to sever a bunch length from the leading end of the tobacco layer advanced by belts 99 and 100 on to fingers 122 after the latter are withdrawn. In this manner, the severed bunch lengths will be superimposed to form a vertical tobacco column in magazine 121. The cutter 136 is supported by extensions of the side walls of magazine 121, which extend along the delivery end of belt 100, in a position to support the tobacco stream as it is advanced thereover on to fingers 122.

A spool valve 137 (Figs. 7 and 22) is slidably mounted in a bore 137b of the cylinder block 135 which is connected by three ports 142a, 142b and 142c to the bore in which piston 141 is mounted. Valve 137 is normally maintained in a predetermined position to open port 142a and partially close port 142b by a spring 138 engaging an adjusting screw 139 threaded into the top of cylinder block 135 and covered by a sealing cap 140.

The pressure applied by the block 132 to the tobacco in magazine 121 to compress the same to a predetermined density should be considerably less than the pressure required on the cutter 133 to sever a bunch length from the leading end of the tobacco layer advanced into the magazine, because the pressure required for severance of the bunch length section would crumble the tobacco in magazine 121 if applied thereto. For this purpose, the fluid supplied through pipe 32a after valve 32 is opened at the proper time by its cam 32c is delivered under pressure into a port 137c in the cylinder head 135 extending into the bore 137b in which the spool valve 137 is located and flows through the port 142a into the space above piston 141 to apply sufficient pressure to knife 133 to sever the bunch length section. The pressure applied to the piston 141 will be determined by the resistance of the tobacco being cut. The pressure applied to piston 141 will correspond to the resistance of the tobacco during the cutting of the bunch length up to a predetermined maximum corresponding to the pressure at which oil is delivered from pump 6. The fluid displaced by piston 141 flows out through ports 142c and 137d into pipe 32b and is returned through valve 32 to the reservoir 56.

The severance of the bunch length section is completed when the piston 141 reaches port 142b, so that when the piston is below this port the pressure of the fluid passing through port 142b and seeping under the portion of valve 137 seated against a bushing 143 will lift the valve 137, to partially close the port communicating with pipe 32a, as shown in Fig. 22. Therefore, the pressure applied to head 132 while it is compressing the tobacco column in magazine 121 will be reduced sufficiently to avoid disintegration of the same. This pressure will remain constant since it is controlled by the action of valve 137 and the adjusted tension of spring 138. If the pressure should tend to increase, valve 137 will move upward closing off the source of pressure. Should it tend to be reduced by downward movement of piston 141, spring 138 will move valve 137 downwardly to admit further oil under pressure. This pressure will remain unvaried during the compression of the tobacco column and head 132 will continue descending until the column is compacted to a predetermined density. Therefore, bunch charges of uniform density will be separated from the lower end of the column by knife 123, and the cigars formed therefrom will be of uniform size.

Since the pressure of spring 138 determines the pressure which must be applied to valve 137 to lift the same into position to partially close the port communicating with pipe 32a, it will be seen that by adjusting nut 139 to regulate the tension of spring 138 the pressure applied to piston 141 during the compression of the tobacco column may be regulated. Thus, the desired unvaried pressure may be applied to head 132 and the column will be compacted to the desired density. When valve 32 is reversed to permit fluid to flow through port 142c and lift the piston 141, fluid under pressure will also flow through perforations in the lower end of bushing 143 into the interior thereof and upwardly through an axial port 137a (Fig. 22) in valve 137 into the space above the upper end of valve 137 and displace the latter downwardly into engagement with bushing 143. Thus, the port leading from the bore in which valve 137 is mounted to pipe 32a will be fully opened and the fluid displaced by the upward movement of piston 141 will flow through port 142a past valve 137 into pipe 32a to be returned to sump 56.

Operating to compress the layer of tobacco in the filler feed channel at the same time that the block 132 is moved downwardly to compress the tobacco column, is a pressure plate 144 having a plate 144a hinged thereon and operated by an arm 145 pivotally connected to one end of a head 146. On the opposite end of this head 146 is slidably mounted a pin 147 attached to plate 144. A compression spring 148 is interposed between head 146 and plate 144. Head 146 is connected to a piston 149 by piston rod 149a protruding from a cylinder 150 which is connected to pipes 32a and 32b and controlled by the valve 32. Therefore, when valve 32 is operated by its cam 32c to force piston 141 down in cylinder head 135, fluid will be supplied simultaneously to cylinder 150 through pipe 32a to displace piston 149 downwardly. Therefore, head 146 will operate the compressor foot 144 to compress the underlying portion of the layer of tobacco in the filler feed channel and its extension 144a will be swung down to press the tobacco into the filler feed channel.

Fingers 122 enter the slots 132a in head 132 in positions above the upper end of the tobacco column after the head 132 has compressed the tobacco column. To move the slide 124 inwardly for this purpose, the valve 37 is operated by its cam to cut off the supply of fluid to pipe 37a and deliver it to the other side of piston 125 through pipe 37b whereby the slide 124 will be moved inwardly. Inward movement of slide 124 will also cause the knife 123 to separate a bunch charge from the lower end of the tobacco column and will be further described in connection with the bunch rolling table. The tobacco column will be held down by the fingers 122 while the block 132 is raised and the next tobacco layer is fed on to fingers 122.

When the valve 32 is displaced by the cam 32c to cut off the flow of fluid into pipe 32a and to permit it to flow into pipe 32b, the piston 141 in cylinder head 135 will be displaced upwardly to raise the block 132 and cutter 133. Piston 149 in cylinder 150 will simultaneously be raised to lift the compressor foot 144 and its extension 144a, to permit the tobacco layer to be fed on to the fingers 122.

The knife 123 is formed from a thin sheet of suitable metal and has a V-shaped indentation (not shown) on its forward end on which the cutting edge is formed. With this shape of cutting edge there is less interference with the movement of the knife through the tobacco column during the cutting of the bunch charge. Moreover, I believe that the arrangement of the knife to separate the bunch charge lengthwise thereof from the tobacco column will result in less displacement of the tobacco in the column, because a smaller width of the knife engages the column than in the case of a knife moving through the column transversely of the bunch length. It will be observed that the tips of the fingers 122 extend sufficiently into the indentations of the ledger plate 136 to hold down the fish tails formed by severance of the bunch length sections. Thus the layer of filler tobacco on belt 100 may be fed on to the fingers 122 without interference by upwardly projecting fish tails in the column. In a prior construction wherein the knife was moved transversely of the bunch length to separate the bunch charge, the fingers were moved with the knife into positions overlying the top of the column and did not hold down the fish tails adjacent the ledger plate.

The swinging members 128 guide the cutting edge of knife 123 into a slot provided below the ledger plate 136 to admit the same. When members 128 are swung apart any tobacco accumulating thereon will fall off. Thus tobacco cannot accumulate on these members in sufficient quantity to interfere with the operation of knife 123.

*Bunch rolling table*

The bunch rolling table (Fig. 8) includes a bed 201 secured to table L and provided with a cover plate 203 to form a suction chamber 202. Plate 203 has longitudinal grooves in which perforations are located. Fastened to either side of bed 201 are two stationary racks 204 and 205. Meshing with these two racks are two pinions 206 and 207, pivoted on the ends of a yoke 208 which is fastened to a piston rod 209 operated by a piston 249 in a cylinder 248 hereinafter described. Above pinions 206 and 207 are two racks 210 and 211 which are slidably mounted on bed 201 and secured to the lower ends of a U-shaped bracket 212. On a shaft 213 supported by lugs of bracket 212 a pair of links 214 and 215 are fastened on the portions of shaft 213 projecting from the lugs of bracket 212 (Figs. 8 and 8C–8G). A bunch rolling pin or roller 216 is mounted on a shaft 216a which is supported in the free ends of links 214 and 215. Arms 217 and 218 are pivotally mounted on the ends of shaft 216a and have attached thereto a rider plate 219.

Figure 8:
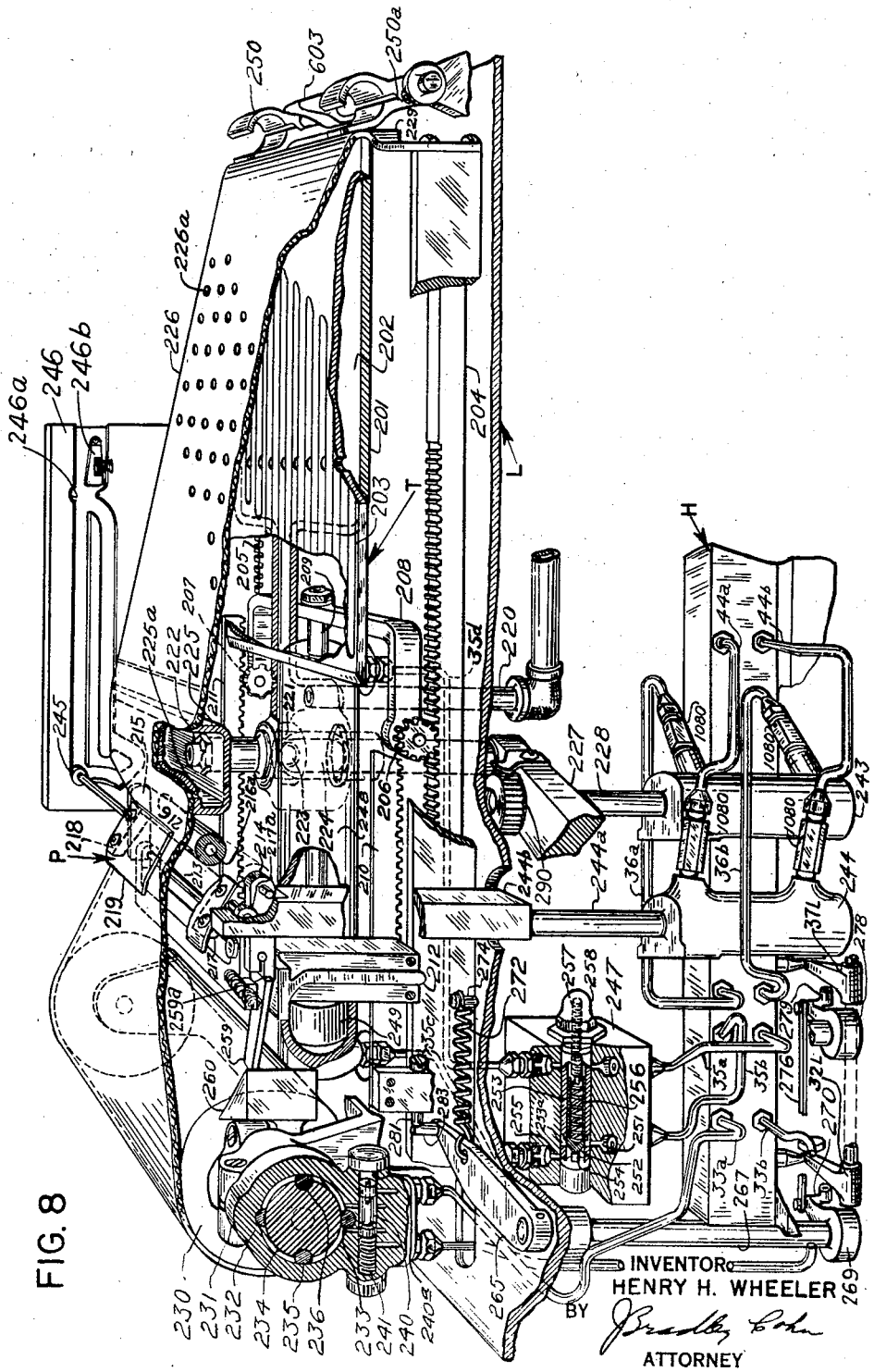
Fig. 8 is a perspective view of the bunch rolling table showing the hydraulic circuits for operating the various parts thereof, certain portions thereof being broken away.

A pair of suction chambers 221 communicate with the suction chamber 202 (only one suction chamber being shown in Fig. 8). Each suction chamber 221 is connected by a pipe 220 (Fig. 2) through pipe 429 to a source of suction (not shown). Two tubes 222 (only one tube 222 being shown in Fig. 8) are slidably mounted in suction chambers 221 and have holes 223 in the portions thereof extending within the suction chambers 221 whereby suction will be maintained continuously in tubes 222. Mounted on the upper ends of tubes 222 is a hollow platform 225 having a flat top with a considerable number of drilled holes 225a therein to cause suctional adhesion of the overlying portion of the rolling apron 226 to the top of platform 225. Attached to the lower ends of tubes 222 is a cross bar 227 which is connected at its central portion to a piston rod 228 to raise platform 225 into the position shown in Fig. 8C to support the lower end of the tobacco column in magazine 121 after the knife 123 is withdrawn from underneath said tobacco column. An adjusting nut 290 threaded on the upper end of rod 228 permits adjustment of the position of platform 225.

One end of the bunch rolling apron 226 is clamped against one end of bed 201 by bar 229 and its other end is secured to a take-up roller 230. Apron 226 extends across the top of cover plate 203 and platform 225, and passes between the rolling pin 216 and the inner end of the rider plate 219.

The apron take-up roller 230 is adjustably attached to the shaft of a rotor 234 of a rotary hydraulic motor 231, the shaft protruding from the housing of this motor and roller 230 being suitably secured on the protruding portion of said shaft.

This motor has a concentric bore in its housing with two semi-circular grooves at the top and bottom of the bore. Plugs 232 and 233 are then set in these grooves and have faces which engage the rotor 234, these faces being concentric to a running fit with rotor 234. Plugs 235 and 236 are set into the rotor 234 in diametrically opposite positions and are turned and ground to provide faces concentric to a running fit with the bore of the housing of motor 231. In an opening formed in the portion of the housing of motor 231 below the rotor 234 is a bore 240a having a slide valve 240, backed up by a light spring 241 normally maintaining valve 240 in a position shown in Fig. 8B, to permit oil to flow through port 237 and past valve 240 into port 238. Ports 237 and 238 are formed in the housing of motor 231, and port 237 is connected by a pipe 33a to the master valve 33. When cam 33c opens valve 33 oil will flow under pressure through port 237 and past valve 240 into 238 and against the plug 236. The oil will also flow through the diametral port 239a shown in Fig. 8A and 8H extending through the rotor 234 and plugs 236 and 235 and communicating with the space 234a from the plug 232 to the plug 235 between the rotor 234 and its housing. Thus the oil will also flow through port 239a against plug 232. The rotor will thus be turned in a counter-clockwise direction to remove the slack from apron 226 to discharge the bunch at the end of the rolling table. Since the port 239 is open at the time valve 240 is in the position shown in Fig. 8B during the counter-clockwise rotation of rotor 234, oil in the space 234d from plug 233 to plug 235 between the housing and the rotor will be displaced by plug 235 through ports 239 and 244 into the pipe 33b to be returned through valve 33 to reservoir 56. The oil of the plug 236 in the space 234c from plug 232 to plug 236 between the rotor and its housing will be forced through the other diametral port 239b which extends through the rotor and plugs 235 and 236 and is shown in Figs. 8B and 8H, and will flow through port 239 and past valve 240 into port 244 to be returned through pipe 33b to valve 33.

A duct 242 formed in valve 240 extends from the port 237 to the right hand of the valve, so that oil will flow through duct 242 and seep between the right end of valve 240 and the motor housing until it builds up sufficient pressure to overcome the resistance of spring 241. The valve 240 will then be moved to the left to the position shown in Fig. 8A and will close port 237 to shut off the flow of oil to the motor. It can be seen that the torque counterclockwise cannot exceed that furnished by the spring 241 so that the rolling apron will not be stretched unduly.

When the platform 225 is raised to the position shown in Fig. 8C, in a manner which will be hereinafter described the rotor 234 will be turned in a clockwise direction. Oil in the space 234b between plugs 233 and 236 will thus be forced through the diametral port 239a into the space 234a between plugs 235 and 232.

As can be readily seen from the above description, a reversal of oil flow created by cam 33c displacing the master valve 33 to permit oil to flow from valve 33 into pipe 33b will cause the oil to flow into port 244 and displace valve 240 to the right. The port 239 will thus be opened and oil will flow therethrough against plug 235 and through port 239b into the space 234c and turn the rotor of motor 231 clockwise to create slack in apron 226. It may be noted that the oil in the spaces 234a, 234b, 234c and 234d serves to hydraulically balance the rotor 234 and thereby avoid the disadvantages of an unbalanced thrust against the bearings of the rotor.

In the operation of my machine, oil under pressure from master valve 36 enters the lower end of a cylinder 243 (Fig. 8) through pipe 36b, thereby raising a piston (not shown) in cylinder 243 and lifting piston rod 228 with bar 227, tubes 222 and platform 225 to the position shown in Fig. 8C. The portion of apron 226 overlying platform 225 is thereby lifted sufficiently to support the tobacco column in magazine 121 when the knife 123 (Fig. 7) is withdrawn from the bottom of the column. The oil flow is then reversed by master valve 36, causing oil to flow into the top of cylinder 243 through pipe 36a; and the portion of apron 226 supported on platform 225 is lowered with the tobacco column supported thereon after severance of a bunch charge from the bottom of the column by the knife 123 (Fig. 7).

At the same time, oil from master valve 44 enter the top of cylinder 244 through pipe 44a causing a piston (not shown) in the cylinder to move the piston rod 244a connected to a bar 244b downwardly. Roller 217a, which is mounted on arm 217, engages with a transverse slot in the upper end of bar 244b (Fig. 8) whereby both links 214 and 215 will be pulled down when piston rod 244a is displaced downwardly as indicated by the arrows on link 214 and bar 244b in Fig. 8C. Links 214 and 215, as previously mentioned, are pivoted on the portions of shaft 213 protruding from bracket 212 and carry the shaft 216a on which the two arms 217 and 218 attached to rider plate 219, as well as rolling pin 216, are mounted. The slot in bar 244b is wide enough to allow roller 217a to swing over the top of shaft 216a while the end of said shaft projecting from link 214 is also in the slot. When bar 244b moves down, the top of the slot engages roller 217a attached to arm 217 which was previously described as being mounted on shaft 216a pivoted in link 214 which, in turn, is pivoted on shaft 213. The shaft 216a will therefore be moved downwardly in an arc concentric with shaft 213. Roller 245 attached to arm 218 being guided by a cam track in the stationary cam plate 246, causes roller 217a to pass over the top of shaft 216a due to the arc described by shaft 216a (see arrow on link 14 in Fig. 8C). On the upward stroke of bar 244b indicated by the arrow thereon in Fig. 8D, the bottom of the slot engages shaft 216a. This upward movement causes roller 245 (which is now at the bottom of the cam 246) to be forced to the right carrying the rider plate 219 attached to arm 217 to the position shown in Fig. 8D and then to the position shown in Fig. 8E. Therefore, the inner end of rider plate 219 will form a loop in the rolling apron 226 in front of platform 225. While rider plate 219 is forming the loop in the apron, the apron is payed out from roller 230 by the operation of motor 231, as previously described, to provide sufficient slack for the formation of the loop. This motion, together with that of the cam roller 245 supported from bracket 218 and moving in the track of the stationary cam plate 246, causes brackets 217 and 218 to turn on shaft 216a until rider plate 219 rests on top of the severed bunch charge which is lowered on apron 226 when the platform 225 descends as indicated by the arrow on tube 222 in Fig. 8C.

The bunch charge is now ready to be rolled into the binder B that has been deposited on the perforated portion of apron 226 provided with holes 226a overlying cover plate 203 as will be more fully described later. The binder so deposited will be suctionally retained thereon by the suction maintained in chamber 202.

Oil from master valve 35, through pipe 35b, enters valve block 247 (to be more fully described later) and then passes out through pipe 35c at the top of block 247 into a cylinder 248 (Fig. 8), thereby forcing piston 249 to the right with its piston rod 209. Piston rod 209 displaces the U-shaped bracket 208 to the right and causes gears 206 and 207 to be turned clockwise by racks 204 and 205 and to displace racks 210 and 211 to the right. Thus the rolling pin 216 and rider plate assembly, which is designated by the reference character P and mounted on bracket 212 as previously described, will move to the right with racks 210 and 211.

During the forward movement of bracket 212 the bunch charge will be coiled upon itself within the loop of the apron while the rider plate 219 holds down the portion of the charge in front of the rolling pin 216. During the rolling of the bunch charge upon itself the roller 245 will be guided in the lower horizontal section of the track in cam plate 246. The rider plate will thereby be maintained in a horizontal position until it reaches the upwardly extending section of the track in cam plate 246 shown in Fig. 8F and is then swung upwardly to the position shown in Fig. 8G while roller 245 passes through this upwardly extending section of the track in cam plate 246. Upon leaving the upper end of this section of track 246 roller 245 enters a recess 246a in the upper horizontal section of track 246 and engages a spring-pressed finger 246b. As the roller 245 rides over member 246b during its continued forward movement, plate 219 is swung rearwardly to a horizontal position. Plate 219 remains in the rearwardly extending horizontal position shown in dotted lines in Fig. 8G during the continued forward movement of the rolling pin 216 while the coiled bunch charge is rolled within the binder previously laid on apron 226 to form a cigar bunch. The cigar bunch so formed is deposited into fingers 250 and 250a, which will be hereinafter described, when slack is removed from the apron by motor 231.

The reversal of oil flow by master valve 35, through pipe 35d, to the right side of cylinder 248 then returns the rider plate and rolling pin to the left in position for the next cycle. during the return movement of the rolling pin the roller 245 will re-engage the finger 246b and be guided into and along the upper horizontal portion of track 246 until the roller 217a enters the transverse groove of bar 244b.

Valve block 247 is a flow control valve, whereas the rate of flow on all other units is predetermined by the sizes of the orifices through which the fluid flows, as the load on said other units is constant. The load on rolling pin 216 varies if the machine is run without filler in the machine and also if different sizes of cigar bunches are made. It is, therefore, necessary to have a power demand control to apply a minimum force to the bunch rolling pin when there is no cigar bunch on the rolling apron and to vary the force applied in accordance with different sizes of cigar bunches. For this purpose there is provided a valve block 247 which may have the construction shown in Fig. 10 of my Patent 2,667,173 dated January 26, 1954. This valve block provides a controlled minimum force when pressure is moving through the pipes 35b to 35c and no obstruction to flow when pressure is moving through pipes 35d and 35a. Since the exact structure is taught and claimed in the aforementioned patent, it is not thought necessary to define any description here other than the above functional statement.

Latch 259 is pivoted on bracket 212 and maintained by a compression spring 259a in a position overlying a step formed on the rear end of link 214 to prevent downward movement of links 214 and 215. Latch 259 is unlocked by engagement with a stationary cap piece 260 when bracket 212 is at the extreme left position to permit the bar 244b, when piston rod 244a is moved downwardly, to lower the roller 217a and thereby swing arms 214 and 215 downwardly as described above. After arm 214 is swung upwardly into horizontal position by the coaction of the transverse slot in bar 244b with the shaft 216a, as shown in Figs. 8D and 8E, the step at the rear end of arm 214 will be engaged by the latch 259 when the latter is locked upon disengaging cam piece 260 during the forward movement of bracket 212. In this manner arms 214 and 215 are maintained in a horizontal position while the rolling pin moves to the end of its forward stroke and then returns to its initial position.

Certain safety devices are incorporated in the bunch rolling table. For example, in case bracket 212 fails to return to its initial position wherein latch 259 engages block 260, the following will occur. The bracket 212, it should be said, might fail to return in case an unduly large bunch charge was deposited on the rolling apron which might cause the rider plate to jam and thereby stop the movement of the rolling pin; but the corrugated cutter 133 and the knife 123 would continue to operate and might cause further jamming.

To obviate the same there is provided a lever 265 secured to a vertical shaft 267 suitably supported in the table L of the machine. To the lower end of shaft 267 is fastened an arm 269 which is provided with a lug 270. A spring 272 connected to lever 265 and anhcored on a post 274 on table L is adapted to move arm 269 into a position wherein its lug 270 underlies the cam lever 32L of the master valve 32 when the rolling pin reaches the end of its forward stroke across the rolling table. A link 276 connects arm 269 to an arm 278 provided with a lug 279 and mounted on a vertical shaft supported in the bed of the machine. Thus, when lug 270 of arm 269 is moved underneath cam lever 32L, lug 279 of arm 278 will be moved underneath cam lever 37L of master valve 37. Thus, whenever stop screw 281 threaded into a block secured to rack 210 fails to return to the position shown in Fig. 8 wherein it engages a post 283 on arm 265, the lugs 270 and 279 will remain underneath the cam levers 32L and 37L and the operation of the corrugated cutter 133, pressure plate 144 and knife 123 will be stopped. If the stop-screw 281 is returned to this position, it will displace the lever 269 sufficiently to move lugs 270 and 279 from underneath cam levers 32L and 37L and permit the operation of the cutter 133 and knife 123 to continue. Since the knife 123 is stopped at its innermost position, the tobacco column in the magazine 121 will be supported on the knife 123. Moreover the operation of the cross-feed will also be interrupted until the operation of cutter 133 is resumed.

On shaft 213 (Figs. 8C, 8D, 8E, 8F and 8G) there may be provided a torsion spring 214a which is anchored at one end to the bracket 212 and connected at its other end to the link 214. The torsion spring serves to maintain the arm 214 in a horizontal position except when lowered by bar 244b. Therefore if the latch 259 should be accidentally disengaged from the step on the rear end of arm 214, the arms 214 and 215 will not swing downwardly.

Due to my improved machine for operating the rider plate to form the loop in the apron it is possible to separate the bunch charge while the lower end of the tobacco column is supported on the apron, without providing excessive space beneath the lower end of the column for swinging the rider plate forwardly on to the separated bunch charge. Moreover no additional mechanism for forming the loop in the apron is requested, as in prior constructions wherein the bunch charge is displaced horizontally along the rolling apron to a position at which the loop is formed at one side of the charge.

A further advantage of the construction of the hydraulic motor 231 for operating the take-up roller 230 of the bunch rolling apron is that the elaborate mechanism now used for tightening the bunch rolling apron to expel the cigar bunch from the loop in the apron is dispensed with. When the cigar bunch is formed in the loop of the apron and advanced therein to a position overlying the fingers 250 and 250a, the slack is removed from the bunch rolling apron by the counter-clockwise rotation of the rotor 234 of motor 231 and the bunch is expelled from the loop into these fingers as the loop is straightened out by tightening the apron. Moreover the amount of slack provided in the apron for the formation of the loop therein is controlled by stops 232, 235 and 233, 236. Thus the amount of clockwise rotation of the take-up roller, when the slack is payed out, is controlled.

*Binder transfer*

The binder transfer illustrated in Fig. 9 is provided with a hollow arm 301 having a hollow binder carrier 302 pivotally mounted on the outer end of arm 301 in a manner similar to that shown in my Patent 2,287,004, so that the interior of the binder carrier will communicate with arm 301. Binder carrier 302 is provided with a detachable perforated bottom 303 on which an adhering binder is transferred from the binder-cutting die to the bunch rolling table. The carrier arm 301 is clamped on the upper end of a hollow shaft 304 which is free to turn and also slide vertically in support bearing 305 fastened to table L. To the lower end of shaft 304 is secured a spider shaped cap 306 with openings 306a for the passage of air from shaft 304 into a suction chamber 308. Fastened by a nut to this cap 306 is the piston rod 307 of a piston 309 in cylinder 310. Splined to hollow shaft 304 is a gear 311 meshing with racks cut in pistons 312 and 313. Piston 312 slides in sleeves 314 and 316 and piston 313 slides in sleeves 315 and 317. Chevron packings 314a, 315a are provided between the ends of sleeves 314 and 316 and also between the ends of sleeves 315 and 317 in the bores of the housing 322 in which these sleeves are located. An annular groove 318 is cut in sleeve 316 (Fig. 20) and an annular groove 319 (Fig. 9) is cut in sleeve 317. Holes are drilled from the bottom of these grooves to the interior of sleeves 316 and 317 to communicate with annular grooves in adjusting heads 320 and 321 having ports in their respective annular grooves. These heads have stems threaded into one end of housing 322. Two blind nuts 320a are threaded on the stems of heads 320 and 321 and seal against leakage and maintain the setting of these heads. Pipes 40a and 40b, which are connected to master valve 40, are connected to ports in housing 322 communicating with annular grooves 318 and 319 in sleeves 316 and 317 (Fig. 20) whereby oil will be supplied to one of these grooves from master valve 340 while oil is being returned through the other pipe from the other groove.

A suction pipe 323, which is connected to a pipe 429 (Fig. 2) leading to a source of suction (not shown) and communicates with suction chamber 308, has a butterfly valve 324 mounted on a spindle 325 provided with an operating lever 326 connected by pin 327 with the cross-head 328 of the piston rod 329 of piston 330 in cylinder 331. Pipes 38a and 38b from master valve 38 carry oil to and from each end of cylinder 331 to displace piston 330 and open or close valve 324 to apply or cut off suction from the binder carrier 302. When suction is applied to the binder carrier, a binder will be suctionally retained on the perforated bottom 303 thereof.

The cut binder is transferred from the binder-cutting die (Fig. 9) to the binder carrier 302, which then overlies the die; and the binder is held on the carrier bottom 303 by suction controlled by suction valve 324 which is in turn controlled by master valve 38. Master valve 40 then opens to send oil under pressure through pipe 40b into the interior of left-hand sleeve 317 through the port in annular groove 319 and the port in the adjusting head 321. Piston 313 is thereby forced away from head 321 and thereby turning gear 311 with hollow shaft 304 and swinging arm 301 to move the binder carrier 302 from binder-receiving position to a position overlying the bunch rolling apron 226 (Figs. 8 and 8G).

At the same time the oil in the right hand sleeve 314 is forced out by piston 312 through the port in head 320 and the port in sleeve 316 into annular groove 318 to be delivered to pipe 40a and conducted back to master valve 40. At the end of this stroke, piston 312 strikes the bottom of head 320 while the binder carrier is over rolling apron 226. After the end of piston 312 closes the ports in the annular groove of head 320, the remaining oil is expelled through a port 320b formed at the base of head 320 and exhausted into pipe 40a. Since the flow of oil through port 320b is considerably restricted, the motion of piston 312 is decelerated and stopped without jars and noise. A port similar to port 320b is provided in head 321 to cushion the end of the stroke of piston 313.

Oil then flows from master valve 39 through pipe 39a to the top of cylinder 310 to displace piston 309 to the bottom of the cylinder 310. The piston rod 307, since it is connected to hollow shaft 304, thereby moves the binder carrier 302 downwardly until the binder on carrier bottom 303 comes into contact with rolling apron 226.

Master valve 38 now reverses to close valve 324 and cut off suction on the binder carrier, and the binder is deposited on the rolling apron. Master valve 39 then reverses and the binder carrier is lifted from the rolling apron. Finally master valve 40 reverses and displaces piston 312 away from the bottom of head 320 whereby the binder carrier is returned to its initial position over the binder die. A stationary bracket 335 corresponding to the bracket 83 of my Patent 2,287,004 supports a pin 337 on which is pivotally mounted one end of a connecting rod 339. The other end of the rod 339 is connected to the binder carrier 302 in the same manner shown in my Patent 2,287,004 to turn the binder carrier on arm 301 to predetermined positions when it overlies the binder die and the bunch rolling apron.

The positions of the adjusting heads 320 and 321 can be regulated by turning the blind nuts 320a threaded on their stems, for positioning the binder carrier accurately over the binder die and rolling apron without losing the cushioning effect obtained by the end of pistons 312 and 313 passing the ports 320b in heads 320 and 321.

*Binder and wrapper die turrets*

Figure 2:
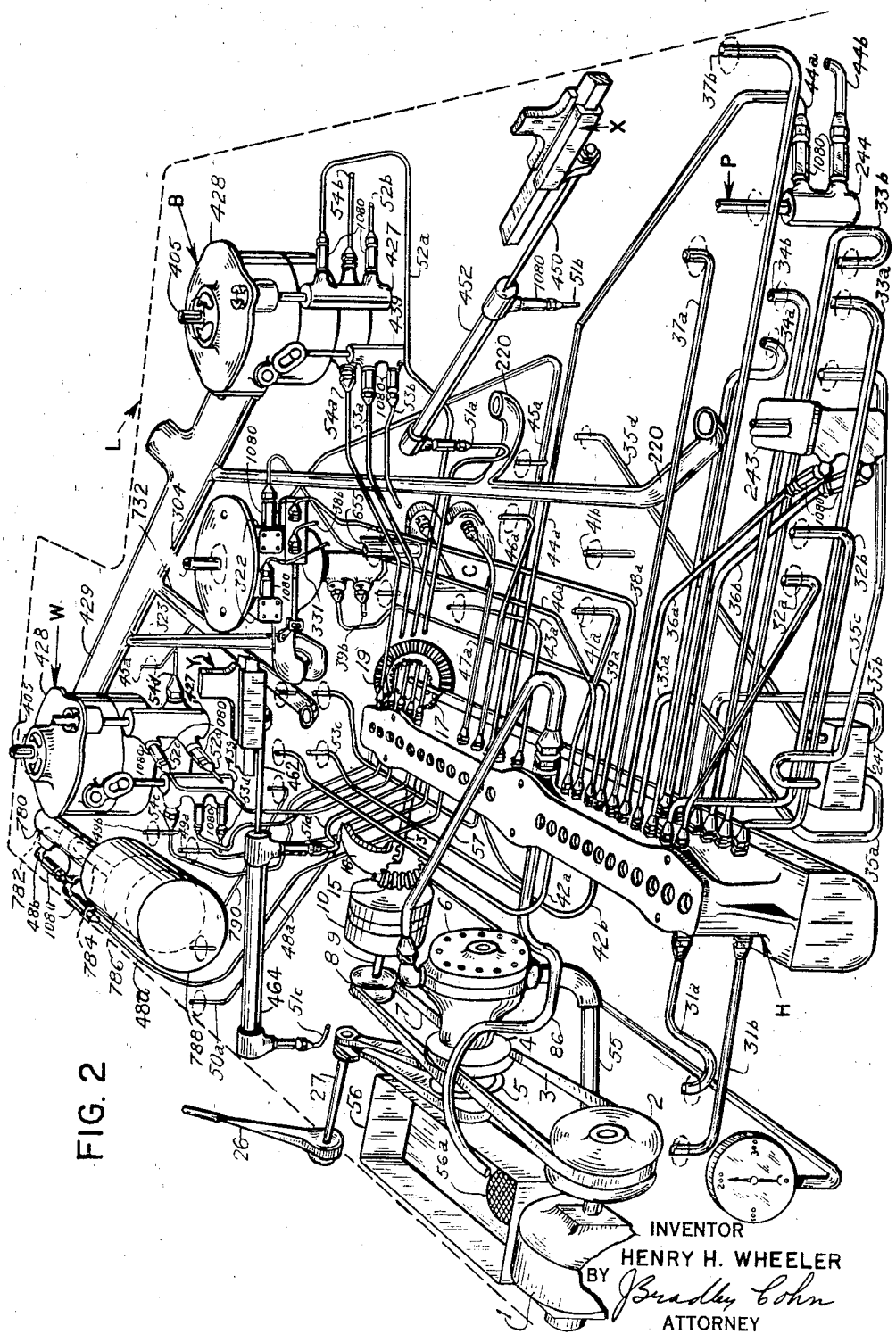
Fig. 2 is a perspective plan view of all those components or assemblies which might be seen below the table if said table were transparent. This view is given mainly to illustrate the main hydraulic circuit and shows the suction lines as well.
Figure 3:
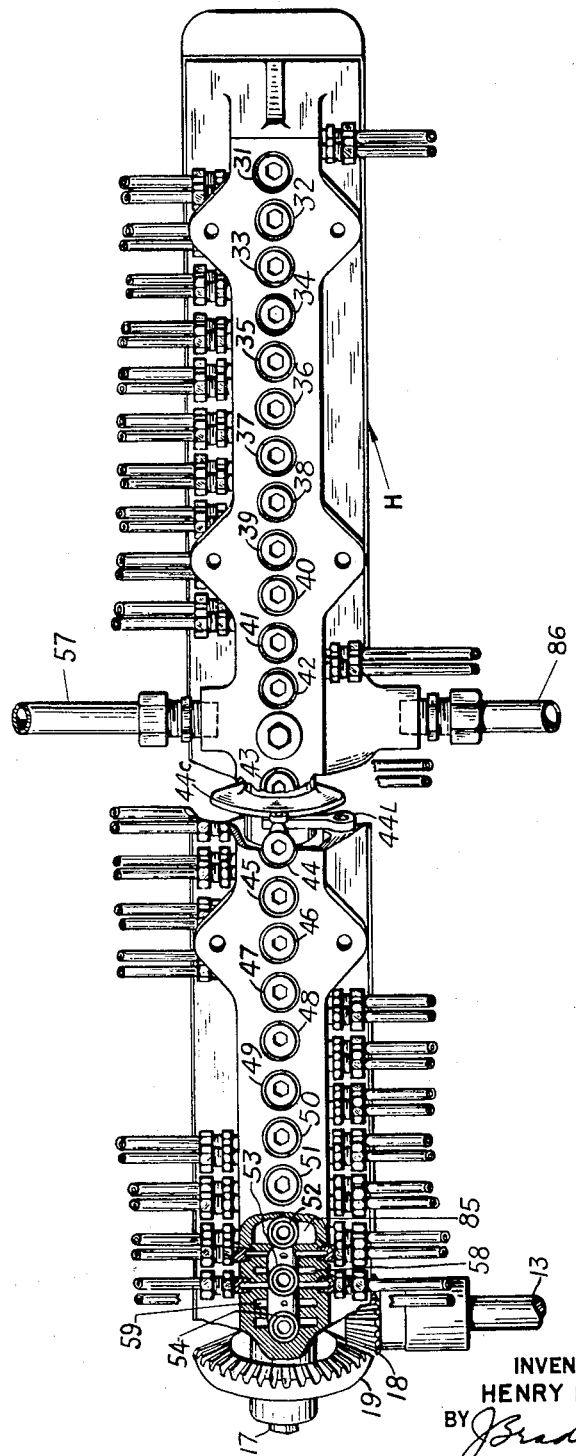
Fig. 3 is a plan view of the master valve housing taken in a slightly inclined postion thereof and showing its general external appearance with certain portions of housing cut away to expose certain valves, the sam shaft, and one of the cams controlling the valves.
Figure 4:
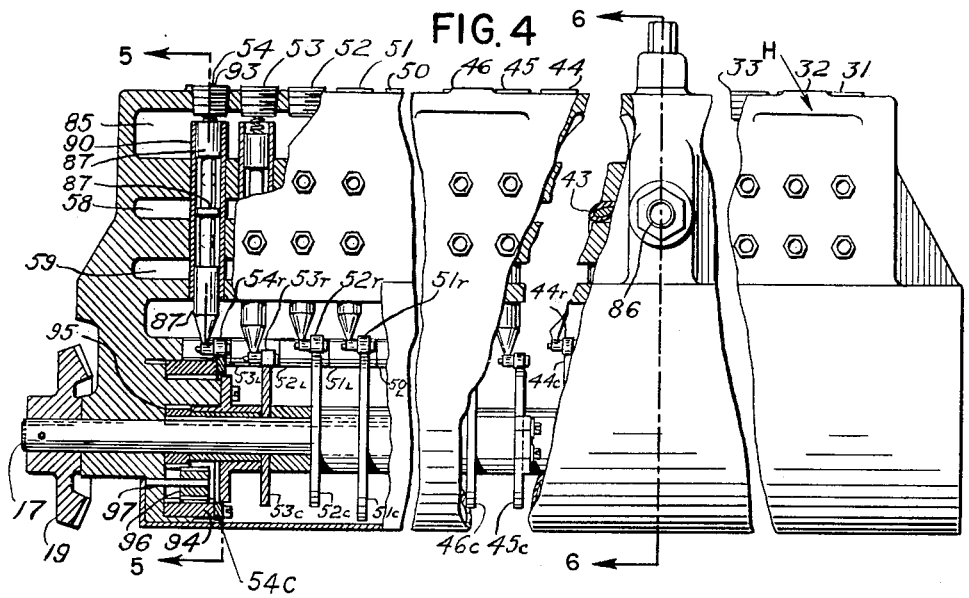
Fig. 4 is a side elevation of the master valve housing with certain portions of the housing cut away in order to expose certain valves and the cam operating the same.

The construction of the binder die turret B shown in Fig. 10 may also be used for the wrapper die turret W. Therefore, the die turret is designated with both reference characters B and W in Fig. 10 and similar parts of these turrets which are shown in Fig. 2 have similar reference numbers. The binder die turret B has a head 400 which is keyed on the rotor shaft 405 of a balanced vane type motor having a housing 401, a rotor 402, vanes 403 slidably mounted in radial slots of rotor 402 and cylinder ring 404. The compression springs 403a (Fig. 11), which are seated against the bases of the slots, keep the vanes 403 in contact with ring 404. The hub of head 400 projects downwardly through an opening in table L and is revolubly mounted on a bracket 428 supported from the bottom of table L. In the lower part of rotor shaft 405 are formed valve chambers 406 and 407 (see Figs. 10 and 13) and annular grooves 408 and 409. A drilled hole 406a connects valve chamber 406 and groove 408, and a similar drilled hole 407a connects valve chamber 407 and groove 409. Two ports 410 and 411 formed in housing 401 connect annular groove 408 to diametrically opposed exhaust sides of the motor. Two more ports 412 and 413 formed in housing 401 connect annular groove 409 to the inlet sides of the motor. To balance the hydraulic pressure exerted radially on the vanes 403, ports 410, 411, 412 and 413 are connected to ports 414, 415, 416 and 417, respectively, at the inner ends of certain vanes. Ports behind the remaining vanes are connected to the ports 414-417 inclusive. In rotor 402, Fig. 13, are two diametrically opposite conical recesses 421 and 422 which are engaged successively by the stem of a piston plunger 420 whose head and stem are slidably mounted in concentric radial bores formed in the ring 404. The bore in which the head of piston plunger 420 is mounted communicates through ports 418 and 419 in ring 404 with ports 412 and 410, respectively. Ports 412a and 413a (Fig. 10) return the oil flowing from ports 412 and 413 into spaces behind the vanes, to the groove 408. Further description of the construction of the motor is deemed unnecessary as it is of conventional construction.

In the operation of the cigar machine oil under pressure enters pipe 54a from master 54 and flows through valve chamber 407 into annular groove 409, and thence through ports 412 and 413 into ports 416, 417 and 418. When oil flows into port 418, which communicates with port 412 and the inner end of the bore in which the head of piston plunger 420 is mounted, piston plunger 420 is lifted out of either the recess 421 or 422 with which it is engaged and rotor 402 revolves clockwise 180°. The rotation of rotor 402 is produced by the pressure of the oil delivered from ports 412 and 413 against portions of vanes 403 protruding from rotor 402. The oil displaced by the vanes during the rotation of the rotor 402 flows through 410 and 411 into the annular groove 408 and thence through hole 406a into chamber 406 to be returned through the pipe 54b to the valve 54. As valve chambers 406 and 407 revolve with rotor 402, chamber 406 takes the position formerly occupied by chamber 407 and chamber 407 moves to the position formerly occupied by chamber 406. The oil now flows from pipe 54a through valve chamber 406 and hole 406a into annular groove 408 and thence through ports 410 and 411 into ports 414, 415 and 419, the port 419 communicating with the port 410 and the outer end of the bore in which the head of piston plunger 420 is mounted. This forces piston plunger 420 into the recess 422 which is then opposite it while the rotor tends to turn counter-clockwise due to the pressure of the oil flowing out of the outlets of ports 410 and 411 against the adjoining vanes 403. As there is considerable weight to the turret and very little to plunger 420, the plunger 420 moves first and locks the rotor against the counter-clockwise motion.

In the next cycle of the machine, oil from the master valve 54 enters the motor from pipe 54b, and as chamber 406 is now where chamber 407 was in the previous cycle, the oil flows into chamber 407 and the turret again indexes clockwise repeating the above cycle. The cam 54c controlling valve 54 has two semi-circular lobes 54x and 54y as shown in Figs. 5 and 10A. The lobe 54x shown in Fig. 10A engaging the cam roller 54r lowers the valve rod 87 of valve 54 and permits oil to flow from chamber 58 through pipe 54a into valve chamber 407 and index the binder die turret 180° and allow the oil to return through pipe 54b into chamber 59. The other lobe 54y of cam 54c raises the valve rod 87 of valve 54 in the next machine cycle to permit the oil to flow from chamber 58 through pipe 54b into the chamber 407 and thus index the turret another 180°, the oil returning through pipe 54a into chamber 85.

The head 400 is provided with a pair of suction beds each provided with a binder cutting die, a shell surrounding the die (the dies and shells not being illustrated in Fig. 10) and a suction head 422 positioned within the die and having a perforated top and a stem 423 projecting downwardly from the bottom of head 400. Since the construction of the binder-cutting die and the die shell surrounding the same is fully described in my Patent 2,287,004, further description thereof is deemed unnecessary. A rod 424 is threaded into each of stems 423 and has a head which rides on bracket 428 until it engages a slot in a head formed on a piston rod 425 actuated by piston 426 in cylinder 427. Pipes 52a and 52b are connected to cylinder 427, and master valve 52 controls the flow of oil under pressure through these pipes into cylinder 427 to raise the suction head 422 from a position below the cutting edge of the die to a position wherein the cut binder is transferred to the binder transfer.

As the binder die turret indexes each die successively to the station at which the cut binder is transferred to the binder transfer by the suction head after being cut at the same station, the head on the rod 424 slides out of the slot in the head of piston rod 425 and rides around on the flat surface of main bracket 428 while the head of rod 424 of the opposite die enters the slot in the head of piston rod 425 while said head is slightly below the position shown in Fig. 10.

Pipe 429, which is connected to a suitable source of suction, (not shown), communicates with cored out chambers 430 and 431 in the bracket which communicate with ports 432 and 433 formed in the hub of head 400 and communicating in the manner shown in my Patent 2,316,828 with the interior of the suction heads 422 and the die shells. Valve 434 is adapted to close off pipe 429 from chamber 431 and thereby cut off the suction in the suction head at the binder-cutting station which communicates through either port 432 or 433, depending upon the position of the turret, with the chamber 431. Valve 434 is mounted on a spindle 435 supported in bracket 428 and connected by arm 436 to a piston rod 437 secured to piston 438. Suction will thus be cut off each suction head 422 at the binder-cutting station when the suction head is raised sufficiently to press the cut binder against the bottom of the binder transfer and then cut on again when this suction head is moved to the other or binder-laying station, by the displacement of piston 438 in cylinder 439 which is connected by pipes 53a and 53b to master valve 53.

In the operation of the binder die turret, leaf tobacco is manually stretched over the die at the binder-laying station of turret B. Cutter rolls 445 (Fig. 1), which may be similar to those described in my Patent 2,287,-004, are similarly mounted on a sliding carriage X to be advanced over the die at the binder-cutting station and cut the binder to the required shape. The carriage X is connected to a pistod rod 450 protruding from a cylinder 452 (Fig. 2) and connected to a piston (not shown) slidably mounted therein. The cylinder 452 is connected by pipes 51a and 51b to valve 51 to reciprocate the carriage X and thereby move the cutter rolls 445 to and fro over the binder die at the cutting station. The cut binder on the die is then transferred to the binder transfer by the suction head 422 when it is raised by piston 426. Suction is cut off from this head 422 when the binder contacts the binder transfer. Suction head 422 then returns to its lower position below the cutting edge of the die. Suction is again turned on by valve 434 and the turret is ready for the next cycle.

A turret similar to the binder die turret B may be used for the wrapper die turret W and is similarly controlled from master valves 52, 53 and 54 through additional pairs of pipes 52c, 52d, 53c, 53d and 54c, 54d connected to these valves (Fig. 2). The wrapper-cutting rolls 460 (Fig. 1) are supported on the sliding carriage Y in the manner described in Patent 2,287,004. A piston rod 462 (Fig. 2) protruding from cylinder 464 is connected to carriage Y and a piston (not shown) in the cylinder. Pipes 51c and 51d connect cylinder 464 to valve 51 whereby the slide Y is reciprocated to move rolls 460 to and fro over the wrapper-cutting die at the wrapper-cutting station of the turret W and thereby cut a wrapper from leaf tobacco.

In case either the cutter rolls 445 or 460 are obstructed manually or otherwise, their movement across the die will be interrupted until the obstruction is removed. The force on the pistons connected to the carriages X and Y on which the cutting rolls are supported, is small enough to permit the cutter rolls to be stopped by the attendant's hand. Therefore there is no danger of injuring the attendant and no additional safety device is required as in prior cigar machines. It may be noted if valve chambers 406 and 407 of the hydraulic motor 402 are made wide enough to prevent closure by the intervening portion of rotor shaft 405 of the ports leading to the pipes 54a and 54b, that an oscillating motor will be provided.

*Binder paster*

The binder paster U (Figs. 14 and 15) is mounted on a hollow frame 501 bolted to the table L. An oscillating shaft 502 is journaled in frame 501 and carries a gear 503 fastened to the portion of shaft 502 inside the frame. A spoon-shaped arm 504 mounted on the portion of the shaft 502 projecting from the frame 501 is held against a flange on shaft 502 by a compression spring 505 seated against a nut 506 threaded on the outer end of shaft 502 whereby arm 504 is frictionally driven to and fro by shaft 502.

Meshing with gear 503 is a rack 507 slidably mounted in frame 501 and secured to one end of cross head 508. On the opposite end of the cross head is secured a piston rod 509 which is actuated by piston 510 in a hydraulic cylinder 511 connected at each end by pipes 41a and 41b to master valve 41.

Attached to the portion of the left hand end of rack 507 protruding from frame 501 is an air cylinder 512 in which is slidably mounted a piston 513 having a piston rod projecting through a guide bushing 514 against which a compression spring 515 is seated, the piston rod being secured to a sleeve 516 engaging the spring 515. Coacting with a flattened portion on sleeve 516 is a cam finger 517 which is fulcrumed on cylinder 512 and held by a leaf spring 518 in firm contact with sleeve 516. A stop screw 519 threaded in a lug on frame 501 engages sleeve 516 and may be adjusted to vary the outward stroke of piston 513. Thus, when the rack 507 moves rearwardly, the sleeve 516 will engage screw 519 and the spring 515 will be compressed while the rack 507 continues moving to the end of its stroke. Sleeve 516 is then held stationary relative to cylinder 512 by cam lever 517 while cylinder 512 moves with rack 507 in the opposite direction to the dotted position (Fig. 14) overlying the bunch rolling table T until released by engagement of finger 517 with a stop screw 521 mounted in lug 511a of cylinder 511 (Fig. 15). Spring 515 then drives sleeve 516 and piston 513 sharply to the right, creating a strong blast of air through nipple 522, to deliver the paste previously picked up by this nipple on to the binder on the bunch rolling apron. Nipple 522 is threaded into the bottom of air cylinder 512 and has an opening communicating with the space in cylinder 512 between piston 513 and guide bushing 514.

A paste pot 523 is supported on an extension of the base of frame 501, and paste is scooped up in a recess in the end of arm 504 when it is turned to and fro by shaft 502 and carried into the nipple 522 wherein it remains until the cylinder 512 reaches the dotted position shown in Fig. 14. A stop pin 525 checks the upward position of arm 504.

In the operation of the machine, when master valve 41 is in the position shown in Fig. 14, oil passes through pipe 41a to the right hand end of cylinder 511, forcing piston 510 to the left. Thus, piston rod 509, through cross head 508 and rack 507, displaces cylinder 512 to the dotted position above the bunch rolling table where the vertical arm of cam finger 517 strikes screw 521 thereby releasing sleeve 516 and causing delivery of paste to the binder on the rolling apron. Arm 504 on shaft 502 is simultaneously moved, through meshing of rack 507 with gear 503, to a dotted position at the right of paste pot 523. This movement of arm 504 is limited by a stop 524.

On the reversal of oil flow by master valve 41, this mechanism returns to the position shown in full lines. The arm 504, while passing through the paste in pot 523, picks up paste before coming in contact with nipple 522. Sleeve 516 then strikes stop screw 519, moving sleeve 516 and piston 513 to the left and causing cylinder 512 to suck up paste into nipple 522. The friction drive of arm 504 allows same to slip on shaft 502 after striking the nipple. It is reset to the proper position at the other end of its stroke by striking pin 524.

*Bunch transfer and bunch locator*

The bunch transfer and locator K shown in Figs. 23 and 24 is provided with a frame 601 fastened to the table L of the machine. On a shaft 602 slidably mounted in frame 601 are supported two pairs of gripper fingers 250 and 250a, one gripper finger of each pair being fastened to shaft 602 by set screws (not shown). The other fingers of both pairs are loosely mounted on shaft 602 and yieldingly held in closed position by springs 605 whereby cigar bunches delivered from the loop of the rolling apron 226 will be inserted between said fingers. On the portion of shaft 602 intermediate the two pairs of fingers 250 and 250a is fastened a casting 603 with an upwardly projecting wedge-shaped lug 603a coacting with the gripper finger 604 supported on the swinging transfer arm 614 to turn the shaft 602 with the gripper fingers 250 and 250a into the position shown in Fig. 24 when fingers 604 and 611 descend into position to grip the cigar bunch Z delivered between fingers 250 and 250a by the bunch rolling apron.

In a socket in the bottom of casting 603 is adjustably mounted the stem 606a of a slotted member 606. A cam roller 607 mounted on a stud 608 fixed in casting 601 engages the slot in member 606. The stem 606a of member 606 is held in position in the socket in casting 603 by a set screw 609. When set screw 609 is loosened the member 606 may be turned to one side or the other and then locked in the adjusted position by set screw 609, to cause shaft 602 to be displaced axially in either direction by the camming action of the slotted member 606 against stationary roller 607 when shaft 602 is turned by the engagement of casting 603 with the finger 604. A torsion spring 610 holds gripper fingers 250 and 250a against the end of the bunch rolling apron 226 except when they are moved to the position shown in Fig. 24 by the engagement of transfer finger 604 with the lug 603a on casting 603.

The transfer arm 614 is of well-known construction and has a shaft 616 journaled in its outer end, the gripper finger 604 being secured to shaft 616 and a gripper finger 611 being pivoted on finger 604 and urged into position to grip a cigar bunch by a torsion spring 618.

Finger 611 is held in open position by latch 612 pivoted on finger 604 and projecting through a slot in finger 611. Latch 612 has a recess 612a engaging the lower edge of the slot in finger 611 to maintain the latter in open position. Latch 612 is released by striking the top of bunch rolling apron 226 to permit the fingers 604 and 611 to grip the cigar bunch Z in fingers 250 and 250a. On shaft 616 is fastened a sprocket 618 which is turned by a sprocket chain 620 running over a sprocket (not shown) on the motor shaft 622, to maintain the fingers 604 and 611 upright while they are moved from the bunch rolling table to the crimper mechanism C. The transfer arm 614 is fastened on the oscillating shaft 622 of a suitable hydraulic motor such as a balanced type vane motor 624. This motor is similar in construction to the motor 704 hereinafter described and is controlled from master valve 46 by pipes 46a and 46b connected to motor 624.

In the operation of the machine the shaft 622 of the motor 624, which is secured to the rotor (not shown) of the motor, turns in one direction to cause fingers 604 and 611 to deliver the cigar bunch from the fingers 250 and 250a to crimper C, and then in the opposite direction to return the fingers 604 and 611 into position to grip the next cigar bunch. These motions are properly timed by master valve 46, and a stop screw (not shown) at each end of its stroke limits the motion of transfer arm 614. The valve 46 is similar in construction to the valve 41 (Fig. 14) and is operated by a cam 46c to allow oil under pressure to flow through first the pipe 46a and then through the pipe 46b into the motor 62 to move the transfer arm 614 to and fro and from the bunch rolling table to the crimper C.

Crimper

The crimper C shown in Figs. 16 and 17, is of novel and simplified construction having a post 651 clamped in a boss formed on the table L. The upper end of this post is provided with an L-shaped head supporting a pair of crimper jaws 652 which are properly spaced to support the head and tuck ends of a cigar bunch. At the bottom of post 651 is clamped a member 653 supporting a hydraulic cylinder 654 in which is slidably mounted a piston 654a having a piston rod 655 pivotally connected to a bell crank lever 656 clamped on a shaft 657 whose ends are supported in a bifurcated portion of a bracket 658. Straddling this bracket 658 and clamped to the projecting ends of shaft 657 is a support member 659 for a pair of crimper jaws 660 and 660a which coact with the jaws 652 to crimp or shape the ends of a cigar bunch. The crimper jaws 652 and 660, 660a have the proper configuration to impart the desired shape to the tuck and head ends of the cigar bunch inserted therebetween.

Two knives 661 and 661a are fastened to the ends of the support member 659 and are adapted to trim the ends of the cigar bunch after they have been shaped by the crimper jaws. On the lower end of lever 656 is mounted a cam roller 662 coacting with a cam block 663 attached to the upper face of the table L.

When the valve rod 87 of master valve 47 is raised into the position illustrated in Fig. 16 by the coaction with the higher lobe of cam 47c of cam roller 47r supported on cam lever 47L oil flows from the chamber 58 through the pipe 47b into cylinder 654. Piston 654a is thereby raised to the position shown in Fig. 17 and member 659 is swung outwardly with the crimper jaws 660 and 660a to the position shown in Fig. 17. When the valve is displaced downwardly during the engagement of cam roller 47r with the lower lobe of cam 47c, oil will flow from chamber 58 into chamber 85 and oil under pressure flows through pipe 47a and enters the upper end of cylinder 654 and displaces the piston 654a and piston rod 655 downwardly. Lever 656 thus swings support member 659 and crimper jaws 660 and 660a toward the opposed crimper jaws 652 to engage and thereby displace a cigar bunch held in transfer fingers 604 and 611 into a position overlying the crimper jaws 652 while fingers 604 and 611 are descending to the position shown in Fig. 17. Thus the finger 611 will be swung away from finger 604 until the recess 612a in latch 612 (Fig. 24) engages finger 611 to maintain it in open position while the cigar bunch is gripped between the crimper jaws 652 and 660, 660a. A further downward movement of piston rod 655 with piston 654a causes member 658 to slide down on post 651 until the crimper jaws are completely closed and member 658 is against the top of table L.

Clamp bar 664 fits against a flat surface on post 651 and is held in frictional contact with the same by compression springs 665 on screws 666 to prevent casting 658 from sliding down by gravity and obtain a firm contact of the crimper jaws 660 and 660a with the bunch ends. The crimper jaws remain closed for nearly a complete cycle to permanently shape the bunch ends. During the downward movement of member 658 knives 661 and 661a coact with crimper jaws 652 to trim the projecting ends of the bunch.

The reversal of oil flow by master valve 47 reverses the action of these parts except that cam block 663 coacts with cam roller 662 to lift the sliding member 658 at the same time that the crimper jaws 660 and 660a swing open. Otherwise the sharp edge of the crimper jaws would tear the bunch.

Cigar bunch and cigar transfers (Fig. 18)

The bunch transfer O includes a transfer arm 701 which swings to and fro from the crimper C to the wrapper-applying device D to remove a cigar bunch from the crimper C after the crimper jaws thereof are opened and transfer it to the wrapper-applying device D. The cigar transfer N includes a transfer arm 702 which swings to and fro from the wrapper-applying device D to the re-rolling mechanism R to remove the cigars from the wrapper-applying device and deposit the same in the re-rolling mechanism which will be hereinafter described. The construction of the transfer arms 701 and 702 and the grippers 701a and 701b and 702a and 702b thereof is similar to that of the transfer 23 fully described in my Patent 2,316,828 except that arms 701 and 702 are secured to the shafts of hydraulic motors 703 and 704.

The hydraulic motors 703 and 704 may be of the balanced vane type and have shafts 706 and 705 on which arms 701 and 702 are secured. Shaft 705 is secured in the rotor of the motor 704 which has radial slots in which the vanes are slidably mounted. Master valve 42 is connected by pipes 42a and 42b to two inlet ports and two outlet ports of motor 704 shown in dotted lines in Fig. 18 which have outlets into the spaces between the vanes and also communicate with balancing ports connected to spaces behind the inner ends of the vanes in the slots. The construction of motor 704 is similar to the construction of the indexing motors of the die turrets except that there is no reversing valve nor annular grooves in the rotor shaft, since motor 704 turns in both directions. When master valve 42 permits oil to flow through pipe 42a into motor 704, the rotor is turned to swing the transfer arm 702 in direction of the arrow with the cigar gripped between fingers 702a and 702b from the wrapper-applying device D to the re-rolling mechanism R. When valve 42 is reversed, the arm 702 is swung in the opposite direction into position to permit fingers 702a and 702b to grip a cigar in the wrapper-applying device D.

The construction of motor 703 is similar to motor 704 and it is similarly controlled by a valve 43 connected therewith through pipes 43a and 43b (not shown in Fig. 18 but illustrated in Figs. 1 and 2) to swing arm 701 with a cigar bunch gripped in fingers 701a and 701b from the crimper C to the wrapping device D and then return the arm 701 into position to permit the fingers 701a and 701b to grip a cigar bunch in crimper C.

Attached to the rotors of these two motors are extensions of shafts 705 and 706, which project into a housing 14a having bearings (not shown) in which the shaft 14 is journaled. The motors 703 and 704 are secured to housing 14a. Cams 707 and 708 mounted on the inner ends of shafts 705 and 706 coact with two limit switches 709 and 710. Another limit switch 711 coacting with cam 712 on the wrapper carrier drive shaft 14 constitutes a safety device to protect these two transfers against breakage if they should obstruct the wrapper carrier arms 714 and 716 of the operating mechanism for the wrapper carrier 724 of the wrapper transfer (Fig. 1).

Arm 716 is mounted on a vertical shaft 718 supported in a lateral extension 14b (Fig. 1) of the housing of column 14a which encloses the upright drive shaft 14 of the operating mechanism of the wrapper transfer. The construction of the column 14a and its lateral extension is shown in my Patent 2,235,857. A gear 720 secured on the upper end of shaft 718 is driven from a gear 722 loosely mounted on shaft 14. Gear 722 is driven from shaft 14 through indexing mechanism (not shown) corresponding to the disk 28, cam-operated gear segment 19, pinion 16, and stationary cam 26 of my Patent 2,235,857. Gear 722 corresponds to gear 13 of said Patent 2,235,857 and intermittently driven from the indexing mechanism (not shown) in the manner described in Patent 2,235,857. Arm 714 is pivotally mounted on arm 716 and has pivotally mounted thereon a wrapper carrier 724 which transfers the cut wrapper from a die on the turret W to the wrapper-applying device D.

The arm 714 is provided with a cam roller (not shown) corresponding to the cam roller 43 of Patent 2,235,857, and engaging a cam track in a stationary cam plate 730 corresponding to the cam plate 47 of Patent 2,235,857. Cam plate 730 is provided with a second cam track engaging a cam roller (not shown) on a member (not shown) corresponding to the cam piece 40, of Patent 2,235,857 to turn the wrapper carrier 724 into the proper positions to receive the cut wrapper from the die turret W and apply it to the cigar bunch in device D. Further description of the construction of the wrapper carrier and its operating mechanism is deemed unnecessary as it is fully described in Patent 2,235,857.

Since the wrapper-applying device D has a construction similar to that shown in Durning Patent 2,290,171, further description thereof is deemed unnecessary except to state that it is driven from a spiral gear 801 fastened on shaft 14 and meshing with a spiral gear 740 on the cam shaft of the wrapper-applying device.

Switches 709 and 710 which are of conventional construction and connected in series (Fig. 27), are normally closed when transfer arms 701 and 702 are not in the path of wrapper carrier arms 714 and 716, but are open while the transfer arms 701 and 702 intersect the path of the wrapper carrier arms, the cams 707 and 708 being suitably timed for this purpose. Switch 711 which is of conventional construction is connected, as shown in Fig. 27, in parallel with switches 709 and 710 and in series with the relay coil of a magnetic switch 1a of conventional construction controlling the operation of motor 1. Cam 712 operates to close the switch 711 while the transfer arms 701 and 702 are out of the path of the wrapper carrier arms 714 and 716 and open switch 711 for the remaining portion of the machine cycle. It can be seen that if either of the transfer arms 701 or 702 is in the path of the wrapper carrier arms 714 and 716, switch 711 together with switch 709 or 710 will be open and due to displacement thereof from their proper positions, the circuit through the coil of switch 1a will be broken and the motor 1 will be stopped. Therefore, no injury to the machine will result if arms 701 and 702 are out of their properly timed positions.

To start the machine again, transfer arms 701 and 702 must be moved manually to a position wherein they will not encounter arms 714 and 716. These arms 701 and 702 do not get out of position in normal operation but may be moved manually in making adjustments and not set back out of the way. Stops (not shown) may be provided at each end of the swing of the arms 701 and 702 to reestablish the correct relationship, but the damage might be done before this can occur.

In connection with the description of the wrapper carrier it may be added that suction is maintained therein by suction applied to arms 714 and 716 from column 14a. Suction is maintained in column 14a by a suction pipe 732 (Fig. 2) connected to suction pipe 429.

Due to this arrangement of column 14a at the left-hand side of the cigar machine instead of at the right-hand side thereof as in prior cigar machines, the bunch transfer O and the cigar transfer N may be supported on the column. Heretofore on some cigar machines these transfers were mounted on a separate support. On other machines a separate support was provided for each transfer. Moreover the relocation of the column 14a permits the rearrangement of the various units of my cigar machine so that less floor space will be required.

Wrapper pasting mechanism

The wrapper paster V (Fig. 1) consists of a paste pot 750, an applicator 752 which applies paste in a predetermined pattern to the flag end of a wrapper suctionally retained on the bottom of wrapper carrier 724, an arm 754 supporting applicator 752 and connected to a piston rod protruding from the hydraulic cylinder 756 (Fig. 1). The cylinder 756 has a piston (not shown) which is connected by the piston rod to arm 754 and is displaced upwardly by fluid supplied from master valve 45 through pipe 45a (Figs. 1 and 2) to elevate applicator 752 from a position in which it is submerged in the paste in pot 750 and apply paste to the flag end of the wrapper on wrapper carrier 724. The wrapper carrier 724 is maintained stationary at its pasting position by its operating mechanism in a manner fully described in my Patent 2,235,857. The fluid displaced by the upward movement of the piston in cylinder 756 is returned to the valve 45 by pipe 45b.

After the wrapper has been pasted, the master valve 45 is reversed and oil then flows through pipe 45b to displace the piston downwardly to submerge the applicator 752 in the paste in pot 750. Reference may be had to the Shedlock Patent 863,106 for further details of the construction of the applicator 752. After the wrapper has been applied to the cigar bunch in the wrapper-applying device D in the manner described in the Durning Patent 2,290,171 with the exception of the flag end of the wrapper, the latter portion of the wrapper is blown down from the wrapper carrier by a device which will now be described.

Flag blowoff

A hydraulic cylinder 780 (Fig. 2) is connected by pipes 48a and 48b to master valve 48. In cylinder 780 is slidably mounted a piston 782 connected by a piston rod 784 to a piston 786 in an air cylinder 788 which is connected to a pipe 790. Fluid flowing from master valve 48 through pipe 48a to cylinder 780 forces piston 782 and piston rod 784 forward. Air piston 786 being attached to rod 784 is therefore moved forward, compressing air in cylinder 788 where it is held under compression by a whistle valve (not shown) until needed. The whistle valve is tripped off by a small cam piece attached to vertical shaft (not shown) and passes through pipe 790 to the flag end of the wrapper carrier 724. Thus a blast of air will be delivered into the flag end portion of the wrapper carrier to remove the portion of the wrapper still adhering to the bottom of the wrapper carrier, so that the flag end portion of the wrapper may be applied to the cigar bunch in the wrapper-applying device D. Master valve 48 then reverses the flow of fluid to hydraulic cylinder 780 to return pistons 782 and 786 to starting position. Air is drawn in at the end of this stroke through a hole in the side of cylinder 788 which is, in turn, closed by piston 786 at the start of its forward motion whereby the air in cylinder 788 will be compressed and held in compressed condition until the whistle valve is tripped in the next cycle of the machine.

Re-rolling mechanism

The re-rolling control mechanism R (Fig. 19) is driven from the spiral gear 801 secured on the vertical driving shaft 14 of the wrapper transfer. Meshing with gear 801 is a spiral gear 802 on a shaft 803 supported in a housing 804 secured to table L. A cam track 802a in gear 802 engages a cam roller 805 on a cam lever 806 fastened to a stub shaft 807 supported in housing 804. A gear sector 808 fastened to shaft 807 transmits an oscillatory motion through a train of gears 809, 810, and 811 to the valve stem 812 of a servo valve 813 which has four splines whose thickness is the same as the diameter of a pair of holes 815 and a pair of holes 816 in a sleeve 814 enclosing valve 813. The holes 815 are spaced 180° apart, and holes 816 are similarly spaced. Each hole 815 is spaced 90° from the adjoining hole 816 around the circumference of sleeve 814. Thus valve 813 will be hydraulically balanced.

There are four annular grooves 817, 818, 819 and 820 in a housing 821 fastened to housing 804 and enclosing sleeve 814. The through holes 815 communicate with groove 817, and the through holes 816 communicate with groove 818. Spaced circumferentially 45° from one of the holes 815 and communicating with groove 819, another through hole 822 is provided in sleeve 814. Spaced circumferentially 90° from hole 822 and communicating with groove 820 still another through hole 823 is provided in sleeve 814.

Groove 819 communicates with two passages 824 formed in housing 821, and shown in dotted lines in Fig. 19 which are connected with ports 825 and 826 formed in a head provided on the outer end of housing 821. From groove 820 there are two more passages 827 formed in the housing 821 and connected with ports 828 and 829 which are also provided in the head on the outer end of housing 821. Ports 825, 826, 828 and 829 communicate with the space inside the head in which a rotor 830 provided with radially movable vanes 831 revolves. The rotor 830 is an integral part of sleeve 814 and carries a shaft 832 on which is mounted a re-rolling drum 833 which co-acts with a stationary concave 834 to roll back and forth a cigar delivered therebetween by the transfer arm 702. A cover 812a mounted on shaft 832 is secured to housing 821. Reference may be had to my Patent 2,337,076 for further details of the construction of concave 834.

Groove 817 communicates with pipe 49a and groove 818 communicates with pipe 49b. Oil under pressure is fed from master valve 49 through pipe 49a to groove 817 and into holes 815 where it is checked by two diametrically opposed splines on servo valve 813. The remaining two splines cover the through holes 816 which communicate through groove 818 with pipe 49b. A slight rotation clockwise of valve 813 allows the oil to enter the space between adjoining splines where it flows along to hole 822. As hole 822 is open at all times, the oil passes through groove 819, which is connected through passages 824 to ports 825 and 826, into the spaces behind the vanes 831 and turns the rotor 828 clockwise. The exhaust oil from the opposite sides of the vanes passes out through ports 828 and 829 and the passages 827 connected to groove 820, into hole 823 (also always open) and along the space between adjoining splines of valve 813 to holes 816.

Since the clockwise movement of servo valve 813 opened hole 816 at the same time as hole 815, the oil flowing out of the motor through passages 827 can pass out through hole 816 into pipe 49b and back to the sump or reservoir 56. Sleeve 814, being an integral part of rotor 830 turns with the same and closes holes 815 and 816 as fast as they are opened by the servo valve. It can be seen from this that rotor 830 will stop turning in a clockwise direction nearly as soon as the rotation of servo valve 813 in the same direction is stopped when the gear segment 808 reaches one end of its stroke. It will also be seen that a counter-clockwise motion of valve 813 and sleeve 814 will produce a similar motion of rotor 830, as oil then enters between the splines leading to ports 828 and 829 by way of groove 820 and hole 823. Thus, the cigar will be given two short rolls in either direction and one long roll in a well-known manner, the cam track 802a in gear 802 being suitably timed for this purpose.

This servo controlled motor permits very light, small gears to transmit a heavy load, as the oil handles the load. Because of this, it was possible to place the re-roll drum 833 facing to the outside of the machine, instead of facing the wrapper-applying device as illustrated in my Patent 2,337,076, and thereby simplifying the removal of the same from its shaft 832.

A knurler 835 is mounted on a sleeve 836 revolving in a frame 837 to which a hydraulic cylinder 838 is secured. Sleeve 836 projects through frame 837 and is connected to the piston rod 839 of a piston 840 mounted in cylinder 838, sleeve 836 being free to revolve on the piston rod. Oil is fed to cylinder 838 from master valve 50 through pipe 50a and returned therefrom through pipe 50b and vice versa, to move the piston 840 to and fro in cylinder 838 and thereby displace the piston rod 839 with sleeve 836 to cause knurler 835 to engage and smooth the head end of a cigar delivered from between the drum 833 and the lower end of concave 834 into clamp fingers 860 and 861 which are operated by mechanism hereinafter described.

The rotary motion of knurler 835 is supplied by a gear 840a splined to sleeve 836 and driven by gear 840b on the shaft 841 of a fluid motor. The fluid motor is of the conventional balanced vane type and has a rotor 841a provided with radially movable vanes 842 and revolving with a ring 843 enclosed in a housing 844 supported on frame 837. A shaft 846 extending forwardly from rotor 841a supports another knurler 847 for hand knurling. A cradle support 848 on which a cigar may be positioned to engage knurler 847 is attached to the hub of motor head 849.

Oil under pressure is supplied to the motor driving knurler 847 from a branch of pipe 49a and returned to master valve 49 through a branch of pipe 49b. Inasmuch as the oil for the motors driving knurler 847 and drum 833 flows in one direction only, master valve 49 is not reciprocated but remains stationary in the proper position to supply oil through pipe 49a on the pressure side of each motor and return oil through pipe 49b to the reservoir 56.

A gear 851 attached to gear 802 drives a gear 852 keyed on cam shaft 853 which is supported in housing 804 and frame 837. The clamp fingers 860 and 861 are supported and operated by mechanism which is controlled by a cam 854 on shaft 853 and is similar to mechanism shown in my Patent 2,337,076 to lightly clamp the cigar while it is being located in a predetermined position by knurler 835 and then firmly clamp the cigar while its tuck end is trimmed by the trimming knives 870 and 871. These knives are operated to trim the cigar to the proper length by mechanism which is fully described in my Patent 2,337,076 wherefore further description thereof is deemed unnecessary. The fingers 860 and 861 then open and allow the trimmed cigar to roll down the plate 872 on to the table to be picked up by the attendant who may then smooth the head end of the trimmed cigar in knurler 847.

Additional special features

The oil cushioning system (Fig. 21) may be used on all hydraulic cylinder assemblies on this machine except the one shown in Fig. 9, although this oil cushioning feature is not shown in any other figure of the drawings, except Fig. 21. It functions as follows and provides for very smooth operation since it does not permit any bottoming of the piston with resultant jars and noise.

It will be seen that the hydraulic cylinder 126 selected to exemplify this feature may be provided with two cylinder heads 1001 and 1002. These cylinder heads are counter-bored so that they may be held by bolts 1005a against the ends of a sleeve 1003, the ends of this sleeve being cut away to fit the cylinder heads.

On the ends of sleeve 1003 are machined two annular grooves 1004. In these annular grooves there are provided two drilled ports 1005 which open into the cylinder bore 1006. The heads 1001 and 1002 are provided with ports 1007 communicating with grooves 1004 and connected to pipes 37a and 37b. When oil is admitted under pressure to the right end of the cylinder through feed pipe 37b, it will enter the cylinder bore through the right port 1007 and displace piston 1008 to the left as shown. Oil at the other side of the piston 1008 will be exhausted through the left-hand port 1007 until such time as piston 1008 blocks off said left-hand port 1005. The remaining oil must then be ejected through a drilled port or passage 1009 which is formed in sleeve 1003 and communicates with and is considerably smaller than port 1007.

Thus, there is considerable restriction of the flow of oil with consequent deceleration of the piston 1008 until it comes to rest. When valve 37 is reversed, oil is delivered through pipe 37a to displace piston 1008 to the right until it is similarly decelerated at the end of the stroke. The oil displaced through the smaller passages 1009 by the movement of piston 1008 is also delivered through either of the annular grooves 1004 to either port 1007 for discharge.

The throttling valve 1080 (Figs. 25 and 26) should be provided on all of the pipes connected to the various hydraulic motors and cylinders, although shown only on certain pipes in Figs. 1, 2, 7, 8, 10, 18 and 19. Each of these valves 1080 consists of a body member having externally threaded ends and bore having a tapered portion 1084 and an internally threaded portion 1086 into which is screwed a threaded needling device 1082. Device 1082 has formed thereon a pin 1083 engaging a ball 1088 mounted in tapered bore 1084. Ball 1088 is held against compression spring 1094 by pin 1083, and compression spring 1094 is sealed against a retainer 1096 which is pressed into the bore.

The orifice area in the tapered portion 1084 of the bore may be decreased or increased, as desired, in order to control the rate of oil flow through valve 1080, by screwing part 1082 in or out in the threaded bore portion 1086. When part 1082 is screwed outwardly, the ball 1088 will also move in the same direction since spring 1094 will push it in that direction. It is evident that the orifice area in bore portion 1084 will be correspondingly reduced, thus reducing the rate of flow of oil through valve 1080.

Part 1082 is provided with two drilled holes 1090 which empty into a hexagonal bore at 1092 formed in part 1082, thus permitting passage of oil therethrough. The retainers 1096 also have two drilled passages 1098 opening into a bore 1100 formed therein to permit passage of oil.

By adjusting needling device 1082 inwardly or outwardly in threaded bore portion 1086, the rate of oil flow through each throttle valve 1080 into the particular hydraulic motor or cylinder to which it is connected may be regulated to obtain motion of the various hydraulically operated parts at the proper time. Unless throttle valves or equivalent flow-controlling means were provided, the parts which offered the least resistance to movement would be operated first regardless of the desired sequence of operation. Thus, the oil flow into the various hydraulically operated units may be regulated by the throttle valves 1080 to obtain the desired sequence of operations. Only the oil flowing from left to right past ball 1088 is restricted; that is, the flow of oil into the various hydraulic motors or cylinders provided with throttle valves 1080. When the oil is exhausted from these motors or cylinders, it flows from right to left through the throttle valves. Thus, the ball 1088 in these throttle valves is displaced to the left to permit a full flow of the exhausted oil.

In view of the foregoing, it will be evident that with the embodiment of the hydraulically operated cigar machine exemplified herein, I am able to reduce its cost and weight by elimination of heavy and expensive cams, shafts, driving connections, etc. Moreover, there is less danger of injury from moving parts of the machine.

I claim:

1. In a cigar machine, the combination with mechanism for forming bunch length tobacco sections and assembling them in a column having a variable depth, mechanism for compacting the column to a predetermined density, mechanism for separating a bunch charge from the compacted column and applying a binder to the separated bunch charge to form a cigar bunch, mechanism for crimping the ends of a cigar bunch to permanently shape the same, mechanism for transferring the cigar bunch from said binder-applying mechanism to said crimping mechanism, mechanism for transferring the cigar bunch from said crimping mechanism to a wrapper-applying station, fluid-operated devices associated with each of said different mechanisms for operating the same, a hydraulic pump, valve means connecting said pump to said fluid-operated devices and operating to supply fluid under pressure from said pump to said fluid-operated devices in a predetermined time relationship, and instrumentalities including pressure regulating devices for regulating the rate at which fluid flows into each of said fluid-operated devices to operate said mechanisms in a predetermined sequence despite differences in the resistance to movement of said various mechanisms.

2. In a cigar machine, the combination with means for applying a wrapper to a cigar bunch to form a cigar, said wrapper-applying means including a wrapper carrier adapted to move a wrapper into position to be applied to a cigar bunch and instrumentalities for moving said wrapper carrier, mechanism for transferring the cigar bunch to said wrapper-applying means; mechanism for re-rolling a cigar; mechanism for transferring a cigar from said wrapper-applying means to said cigar re-rolling mechanism; mechanism for smoothing the head end of a cigar, said re-rolling mechanism operating to deliver the cigar to said smoothing mechanism; fluid-operated devices associated with each of said different mechanism for operating the same; a control for the fluid operated device associated with said re-rolling mechanism; a hydraulic pump; valve means connecting said pump to said fluid-operated devices and operating to supply fluid under pressure to said fluid-operated devices in properly timed relationship to operate said mechanism in a predetermined sequence; and a safety device adapted to stop said wrapper-applying means, pump and control when the motion of the instrumentalities for moving said wrapper carrier is obstructed either by said bunch transferring mechanism or said cigar transfer mechanism.

3. In a cigar machine, the combination with mechanism for forming bunch length tobacco sections and assembling them in a column having a variable depth, mechanism for compacting the column to a predetermined density, mechanism for separating a bunch charge from the compacted column and applying a binder to the separated bunch charge to form a cigar bunch, mechanism for crimping the ends of a cigar bunch to permanently shape the same, mechanism for transferring the cigar bunch from said binder-applying mechanism to said crimping mechanism, means for applying a wrapper to a cigar bunch to form a cigar, mechanism for transferring the cigar bunch from said crimping mechanism to wrapper-applying means, fluid-operated devices associated with each of said different mechanisms for operating the same, a hydraulic pump, valve means connecting said pump to said fluid-operated devices and operating to supply fluid under pressure from said pump to said fluid-operated devices in properly timed relationship to operate said mechanisms in a predetermined sequence, an electric motor driving said pump, said wrapper-applying means including a wrapper carrier adapted to move a wrapper in a predetermined path and instrumentalities for moving said wrapper carrier, said electric motor being connected to said instrumentalities and driving the same in predetermined timed relationship to said mechanisms, and a safety device adapted to disconnect said motor from said pump and said instrumentalities and thereby stop the operation of said mechanisms and said instrumentalities when the motion of said wrapper carrier is obstructed by the mechanism for transferring the cigar bunch from the crimping mechanism to the wrapper-applying means.

4. A binder transfer for transferring a binder from a binder die to a bunch rolling apron comprising a hollow pivoted member connected to a source of suction, a hollow binder carrier mounted on said member and having a perforated bottom on which a binder is suctionally retained to be transferred from the binder die to a bunch rolling apron, hydraulically operated mechanism for swinging said member to carry the binder adhering to the binder carrier bottom from a binder-receiving position above the binder die to a position overlying the bunch rolling apron, said hydraulically operated mechanism including a gear connected to the pivoted member on which the binder carrier is mounted, a pair of racks meshing with said gear, a pair of cylinders in which said racks are slidably mounted, and a pipe for delivering fluid under pressure to one of said cylinders to displace the rack slidably mounted therein whereby said pivoted member will swing said binder carrier to binder-receiving position, and a pipe subsequently delivering fluid under pressure to the other of said cylinders to displace the rack slidably mounted therein whereby the binder carrier will be moved from binder-receiving position to a position overlying the bunch rolling apron and the fluid in the other cylinder will be expelled therefrom by its cylinder into the pipe connected to the latter cylinder.

5. A binder transfer for transferring a binder from a binder die to a bunch rolling apron comprising a hollow pivoted member connected to a source of suction, a hollow binder carrier mounted on said member and having a perforated bottom on which a binder is suctionally retained to be transferred from the binder die to a bunch rolling apron, hydraulically operated mechanism for swinging said member to carry the binder adhering to the binder carrier bottom from a binder-receiving position above the binder die to a position overlying the bunch rolling apron, said hydraulically operated mechanism including a gear connected to the pivoted member on which the binder carrier is mounted, a pair of racks meshing with said gear, a pair of cylinders in which said racks are slidably mounted, and a pipe for delivering fluid under pressure to one of said cylinders to displace the rack slidably mounted therein whereby said pivoted member will swing said binder carrier to binder-receiving position, and a pipe subsequently delivering fluid under pressure to the other of said cylinders to displace the rack slidably mounted therein whereby the binder carrier will be moved from binder-receiving position to a position overlying the bunch rolling apron and the fluid in the other cylinder will be expelled therefrom by its cylinder into the pipe connected to the latter cylinder, devices in each of said cylinders for cushioning the end of the fluid-ejecting stroke of the cylinders, said devices being adjustable to vary the positions of the binder carrier over the rolling apron and the binder die.

6. In a cigar machine, the combination with a rotary die turret, said turret being provided with a pair of cutting beds, of hydraulic means for intermittently turning said turret to advance each bed successively to a cutting station, said means including a balanced vane type hydraulic motor, said motor including a rotor which is connected to said turret, vanes projecting from said rotor, inlet and outlet ports communicating with spaces between said vanes, a hydraulically operated locking device communicating with said inlet and outlet ports and adapted to engage said rotor to prevent rotation of said turret while one of the cutting beds is at the cutting station, and a reversing valve mounted on said rotor to revolve therewith, said reversing valve having primary and secondary valve chambers connected to said inlet and outlet ports respectively, whereby fluid under pressure will be supplied to the inlet port and locking device in one cycle of the machine to cause said rotor to revolve and said locking device to release said rotor, said reversing valve operating in the same machine cycle to supply fluid under pressure from the secondary valve chamber to said outlet port and cause said locking device simultaneously to engage the rotor when a cutting bed has been indexed to the cutting station whereby said turret will remain stationary, means for supplying oil under pressure to the primary valve chamber of said reversing valve in successive machine cycles whereby the locking device will be disengaged and fluid under pressure will be delivered to the inlet port of the motor in successive machine cycles to cause the turret to rotate in the same direction and advance the cutting beds successively to the cutting station.

7. In a cigar machine, the combination with an axially movable shaft, of sets of gripper fingers mounted on said shaft and adapted to grip a cigar bunch delivered from a bunch rolling apron, a bunch transfer movable into position to grip the cigar bunch in said fingers and transfer it away to a predetermined position, and a device operated by said bunch transfer for axially displacing said shaft and thereby locating the bunch axially before it is removed by said bunch transfer.

8. In a cigar machine, the combination with an axially movable shaft, of sets of gripper fingers mounted on said shaft and adapted to grip a cigar bunch delivered from a bunch rolling apron, a bunch transfer movable into position to grip the cigar bunch in said fingers and transfer it away to a predetermined position, and a device operated by said bunch transfer for axially displacing said shaft and thereby locating the bunch axially before it is removed by said bunch transfer, said device being adjustable to displace said shaft in either direction.

9. In a cigar machine, the combination with an axially movable shaft, of sets of gripper fingers mounted on said shaft and adapted to grip a cigar bunch delivered from a bunch rolling apron, a bunch transfer movable into position to grip the cigar bunch in said fingers and transfer it to a predetermined position, and a device operated by said bunch transfer for axially displacing said shaft and thereby locating the bunch axially before it is removed by said bunch transfer, said device including a member mounted on said shaft in position to be engaged by said transfer and turned with said shaft when said transfer moves into position to grip the cigar bunch in said fingers, said member having a slotted portion, and a stationary roller engaging the slot in said slotted portion to displace the shaft axially when said member is turned by said bunch transfer.

10. A cigar bunch crimper comprising, a primary pair of stationary crimper jaws adapted to support the head and tuck ends of a cigar bunch, a slidable member, a support pivotally mounted on said member, a secondary pair of crimper jaws secured to said support, means for swinging said support to move said secondary jaws into a position adjacent said stationary jaws to grip the ends of a cigar bunch positioned therebetween and then displace said slidable member downwardly to move the secondary jaws into fully closed position to shape the ends of said bunch, said means operating to swing said support with the secondary jaws away from the primary jaws to permit removal of the cigar bunch after its ends have been shaped, and an abutment adapted to engage said support while it is being swung away from the primary jaws to displace said slidable member upwardly.

11. In a cigar machine, the combination with a pair of primary crimper jaws adapted to support the ends of a cigar bunch, of a slidable member, a pivoted support pivoted on said member, secondary crimper jaws mounted on said support and adapted to coact with the primary crimper jaws to shape the ends of the cigar bunch supported on the primary crimper jaws when said support is swung toward the primary jaws, knives secured to the ends of said secondary crimper jaws and adapted to trim ends of the cigar bunch projecting from the primary jaws, and means for swinging said support toward said primary crimper jaws and then lowering said slidable member and said support to cause the crimper jaws to shape the ends of the cigar bunch and cause the knives to trim the ends of the cigar bunch.

12. In a cigar machine, the combination with a bunch transfer adapted to carry a cigar bunch, of a hydraulic motor connected to said bunch transfer for moving it from a predetermined bunch receiving position to a device for applying a wrapper to a cigar bunch, a wrapper-transfer movable in a predetermined path intersecting the path of said bunch transfer and adapted to transfer a wrapper to the wrapper-applying device, and means for stopping the cigar machine if said bunch transfer is displaced into position to obstruct the wrapper carrier, a cigar transfer adapted to transport a cigar, a hydraulic motor for operating said cigar transfer from the wrapper-applying device to a re-rolling mechanism through a predetermined path intersecting the path of the wrapper carrier, said means operating to stop the machine if said cigar transfer is displaced into a position to obstruct the wrapper carrier.

13. A hydraulic motor having a housing provided with a concentric bore, a rotor mounted in said concentric bore, plugs secured in said rotor in diametrically opposite positions, stops secured in said housing in diametrically opposite positions to engage said plugs and thereby limit the rotation of said rotor, said plugs and said stops forming diametrally opposed chambers in said bore, passages through said rotor to communicate diametrally opposed pairs of chambers at said plugs a pair of openings formed in said housing at either side of one of said stops and communicating with said concentric bore, an elongated bore in said housing communicating with said openings, an inlet port and an outlet port communicating with said elongated bore, a valve slidably mounted in said elongated bore, a spring yieldingly holding said valve against one end of said elongated bore to permit fluid under pressure to flow from said inlet port past said valve and through one of said openings into one of said passages in said rotor in the concentric bore to turn said rotor counter-clockwise and cause fluid to flow from other of said passages in said rotor in said concentric bore past said valve and into the outlet port, said valve having a hole extending from the inlet port to the end of the valve which is held against the end of the elongated bore by said spring whereby fluid will flow through said hole and displace said valve against the resistance of said spring to close said inlet port and stop the counter-clockwise rotation of said rotor.

14. A cigar re-rolling mechanism comprising a stationary concave, a revoluble drum coacting with said concave to roll back and forth a cigar inserted between the drum and concave, and a fluid-operated device for oscillating said drum to roll said cigar to and fro, said fluid-operated device including a servo valve provided with four equally spaced splines extending longitudinally thereof, a sleeve enclosing said valve, said sleeve having a primary pair of aligned diametrically opposite holes which are normally closed by diametrically opposite splines of said valve, and said sleeve also having a secondary pair of aligned diametrically opposite holes spaced 90° circumferentially from said primary pair of holes and normally closed by the other two splines of said servo valve and primary and secondary individual holes spaced 90° circumferentially from each other, said primary and secondary individual holes communicating with spaces between adjoining splines of said valve, a housing enclosing said sleeve and provided with spaced primary and secondary annular grooves respectively communicating with said primary and secondary pair of holes in said sleeve, said primary annular groove being connected to a source of fluid under pressure, a vane type hydraulic motor having a rotor provided with radial vanes and connected to said valve and drum and revolving within said housing, annular grooves communicating with said primary and secondary individual holes and connected to the spaces between the vanes of said rotor to deliver fluid under pressure to spaces between the vanes of said motor and return fluid from said motor, and a device for oscillating said valve to cause fluid under pressure to flow into said motor and oscillate said rotor and thereby oscillate said drum.

15. A cigar re-rolling mechanism comprising a stationary concave, a revoluble drum coacting with said concave to roll back and forth a cigar inserted between the drum and concave, and a fluid-operated device for oscillating said drum to roll said cigar to and fro, said fluid-operated device including a servo valve provided with four equally spaced splines extending longitudinally thereof, a sleeve enclosing said valve, said sleeve having a primary pair of aligned diametrically opposite holes which are normally closed by diametrically opposite splines of said valve, and said sleeve also having a secondary pair of aligned diametrically opposite holes spaced 90° circumferentially from said primary pair of holes and normally closed by the other two splines of said servo valve and primary and secondary individual holes spaced 90° circumferentially from each other, said primary and secondary individual holes communicating with spaces between adjoining splines of said valve, a housing enclosing said sleeve and provided with spaced primary and secondary annular grooves respectively communicating with said primary and secondary pair of holes in said sleeve, said primary annular groove being connected to a source of fluid under pressure, a vane type hydraulic motor having a rotor provided with radial vanes and connected to said valve and drum and revolving within said housing, annular grooves communicating with said primary and secondary individual holes and connected to the spaces between the vanes of said rotor to deliver fluid under pressure to spaces between the vanes of said motor and return fluid from said motor, a device for oscillating said valve to cause fluid under pressure to flow into said motor and oscillate said rotor and thereby oscillate said drum, said device including a train of gears connected to said valve, a gear segment driving said gear train, a cam lever connected to said gear segment, and a cam operating said cam lever and gear segment to produce two short rolls of said drum in opposite directions and a long roll.

16. In a mechanism for feeding charge lengths of tobacco in a cigar machine, a horizontal conveyor belt; a plurality of pulleys; a driven pulley engaging said conveyor belt; a one way clutch operatively connected to drive said driven pulley, a pinion gear operatively connected to said one way clutch to drive said clutch and said pulley when said pinion gear is rotated in one direction only, a hydraulic motor having a reciprocating piston, a rack secured to said piston engaging said pinion gear to drive said pinion gear to and fro during reciprocation of said piston, a source of fluid under pressure, means to connect said source of fluid under pressure to said hydraulic motor to supply pressure to said piston to operate it, said means including a two way valve operative in a first position to move said piston to the retracted position and in the second position to move said piston in a direction to move said pinion and said one way clutch to drive said driven pulley, a movable detent engaging said valve to retain it in either of said two positions, said detent engaging said valve in said first position to hold said piston in retracted position, instrumentalities to urge said valve into said second position when said detent is moved to disengaging position so that said piston will be moved in a driving movement, a contact device connected to said valve and movable to a selected adjusted position, means connected to said piston to contact said contact device during the driving movement to move said valve to said second position so that the length of stroke of said piston may be set at selected positions and said piston will remain in each cycle until said detent is moved to inoperative position.

17. An intermittent conveyor feed belt mechanism for feeding charges to the measuring chamber of a cigar machine, comprising a conveyor belt; a driven pulley engaging said conveyor belt; a hydraulic motor driving said pulley in one direction only; and a valve means to control the operation of said hydraulic motor, a device on said valve means responsive to a demand for charges in said storage chamber to move said valve means to energize said motor, further adjustable instrumentalities on said valve means to arrest the movement of said motor when it has operated through a predetermined stroke.

18. A mechanism for intermittent feeding by conveyor belt in a cigar machine, feed means, a hydraulic motor piston to move said feed means; valvular means to control said hydraulic piston; a detent to hold said valve means in a first position to prevent operation of said hydraulic piston, means to move said valve means to piston operating position when said detent is removed, an adjustable stop on said valve means to return said valve means to said first position, and a stop engaging member connected to said piston to engage said adjustable stop when said piston has moved a selected predetermined amount.

References Cited in the file of this patent
UNITED STATES PATENTS

| | | |
|---|---|---|
| Re. 21,746 | Rundell | Mar. 11, 1941 |
| 707,828 | Cowan | Aug. 26, 1902 |
| 1,235,595 | Pentice | Aug. 7, 1917 |
| 1,252,935 | Norquest | Jan. 8, 1918 |
| 1,442,200 | Wahlstrom | Jan. 16, 1923 |
| 1,582,545 | Rundell | Apr. 27, 1926 |
| 1,715,141 | Mathieson | May 28, 1929 |
| 1,740,575 | Clausen | Dec. 24, 1929 |
| 1,945,022 | Clausen | Jan. 30, 1934 |
| 2,135,892 | Granstedt | Nov. 8, 1938 |
| 2,143,147 | Ferris | Jan. 10, 1939 |
| 2,164,876 | Horlacher | July 4, 1939 |
| 2,204,980 | Clausen | June 18, 1940 |
| 2,222,819 | Light | Nov. 26, 1940 |
| 2,287,004 | Wheeler | June 16, 1942 |
| 2,298,279 | Clausen | Oct. 13, 1942 |
| 2,311,011 | Wheeler | Feb. 16, 1943 |
| 2,316,828 | Wheeler | Apr. 20, 1943 |
| 2,320,346 | Broekhuysen | June 1, 1943 |
| 2,324,509 | Jorgensen | July 20, 1943 |
| 2,327,020 | Clausen | Aug. 17, 1943 |
| 2,331,905 | Halstead | Oct. 19, 1943 |
| 2,337,076 | Wheeler | Dec. 21, 1943 |
| 2,337,573 | Schultz | Dec. 28, 1943 |
| 2,356,636 | Wheeler | Aug. 22, 1944 |
| 2,372,189 | Dougherty | Mar. 27, 1945 |
| 2,379,575 | Granstedt | July 3, 1945 |
| 2,380,873 | Schafer | July 31, 1945 |
| 2,396,787 | Hawthrone | Mar. 19, 1946 |
| 2,464,962 | Bent | Mar. 22, 1949 |

FOREIGN PATENTS

| | | |
|---|---|---|
| 48,981 | Sweden | Aug. 24, 1917 |
| 389,791 | Great Britain | Aug. 4, 1938 |